July 7, 1970 C. H. LITTLE ET AL 3,519,905

NUMERICALLY CONTROLLED X—Y SERVO-MECHANISMS FOR A DRAFTING MACHINE INCLUDING SECONDARY STORAGE OF PERMANENT INFORMATION

Filed Aug. 26, 1966 9 Sheets-Sheet 1

July 7, 1970 C. H. LITTLE ET AL 3,519,905

NUMERICALLY CONTROLLED X—Y SERVO-MECHANISMS FOR A DRAFTING MACHINE INCLUDING SECONDARY STORAGE OF PERMANENT INFORMATION

Filed Aug. 26, 1966 9 Sheets-Sheet 4

United States Patent Office 3,519,905
Patented July 7, 1970

1 2

3,519,905

NUMERICALLY CONTROLLED X–Y SERVO-MECHANISMS FOR A DRAFTING MACHINE INCLUDING SECONDARY STORAGE OF PERMANENT INFORMATION

Charles H. Little, Cleveland, and Waldo H. Kliever and Eugene L. Wiemels, Cleveland Heights, Ohio, assignors to Universal Drafting Machine Corporation, Bedford Heights, Ohio, a corporation of Ohio Continuation-in-part of application Ser. No. 540,123, Mar. 2, 1966. This application Aug. 26, 1966, Ser. No. 575,373
Int. Cl. G05b *19/28*
U.S. Cl. 318—568 14 Claims

ABSTRACT OF THE DISCLOSURE

There is disclosed herein an automatic drafting apparatus including data processing circuits for supplying drafting information to motors utilized for the purpose of moving scribing elements over a drafting surface; said information also being utilized for effecting the engagement of the said elements with the drafting surface. In particular, there is disclosed a control system for such apparatus wherein information may be supplied from external means such as a tape reader, from system internal means such as an information storage or a plurality of such storages and from manual means. Information supplied from automatic means is processed through and by a numerical control director and supplied to table electronics the table electronics including digital to analog conversion circuits. Digital information is also supplied from drafting sensors to the table electronics and is there combined with information from the numerical control director prior to conversion. The combined information is converted to analog signals and utilized among other things to power the motors mentioned above.

The present invention relates to an automatic drafting apparatus capable of making drawings including continuous or dashed straight lines, curves, circles, etc., mathematically generated designs such as loft lines, loft drawings, templates, etc., and mirror-image or reverse drawings, etc., using pencils, pens, scribe tools utilizing digital data from a source of such information such as a numerical control director.

This application is a continuation-in-part of our copending application Ser. No. 540,123, now Pat No. 3,398,452 filed Mar. 2, 1966 which in turn is a continuation-in-part of our application Ser. No. 262,590, filed Mar. 4, 1963, now abandoned.

It is a fundamental object of the present invention to provide a completely automatic electronic drafting machine capable of producing drawings representative of previously programmed drawings consisting of straight lines, curves, circles and the like, and for producing drawings representative of mathematical data not having previously been reduced to concrete form such as loft lines.

It is an object of this invention to provide a completely automatic electronic drafting machine capable of receiving digital input information and having control circuits capable of utilizing such information in conjunction with internally generated data for producing a drawing.

It is another object of this invention to provide a completely automatic electronic drafting instrumentality having permanent and/or semi-permanent storages utilized for the purpose of providing command information and control information to be utilized in the production of a drawing.

It is another object of this invention to provide a completely automatic electronic drafting device having means whereby input data is externally or internally fed to the device for the puropse of producing a drawing.

It is another object of the present invention to provide an automatic electronically controlled drafting instrumentality having manual control means to override the automatic controls and to thereby allow an operator to manually or semi-automatically produce a drawing.

It is another object of this invention to provide an automatic electronically controlled drafting instrumentality that will inexpensively and rapidly provide a highly reliable visual representation of a coded input.

Further objects and advantages of the invention will be apparent to those skilled in the art to which it relates from the following description of the preferred embodiment described with reference to the accompanying drawings forming a part of this specification, in which similar reference characters designate corresponding parts, and in which.

Figure 4:
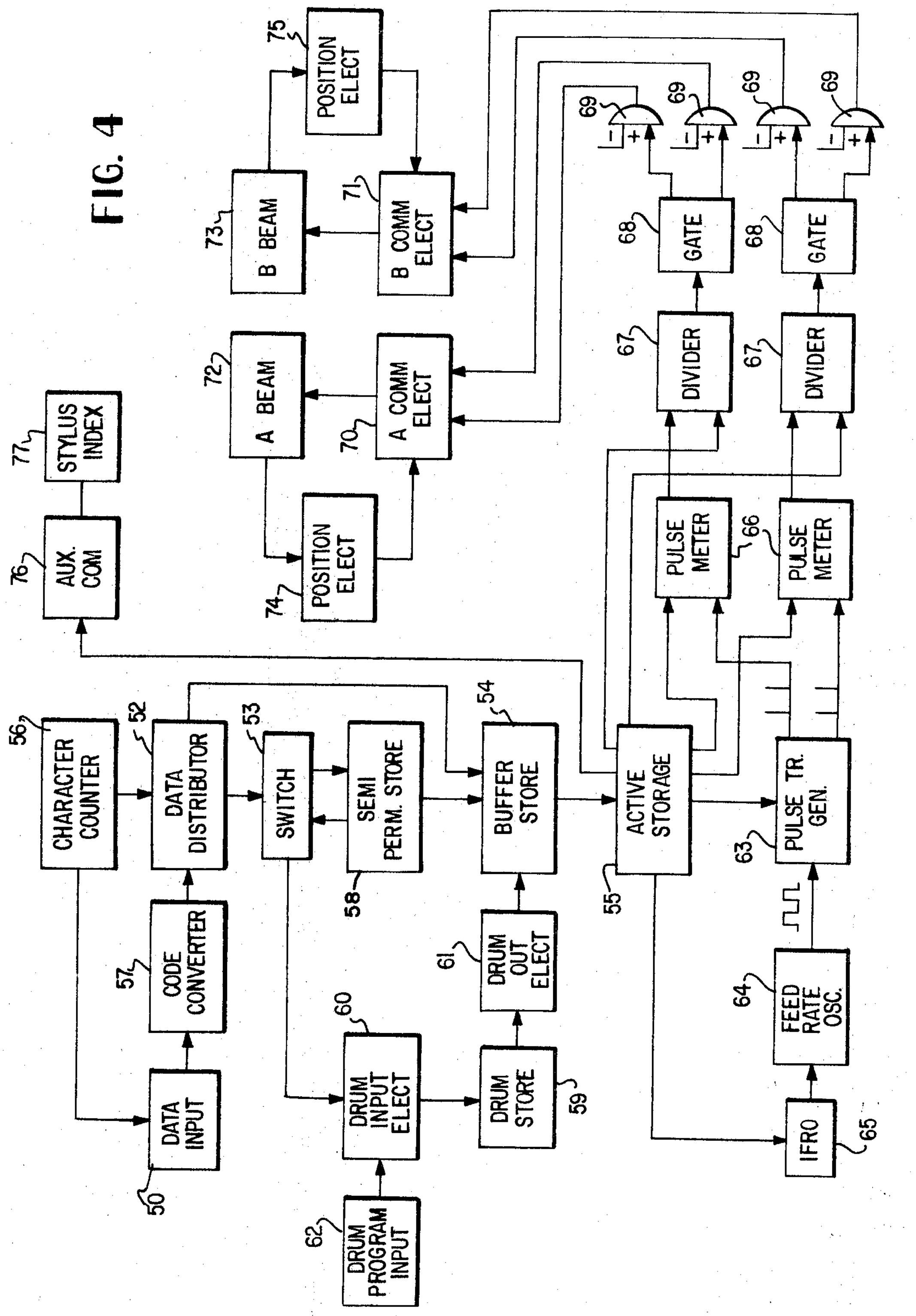
FIG. 4 is a functional block diagram of the electronics control circuitry utilized to control the apparatus shown in FIG. 1.
Figure 5A:
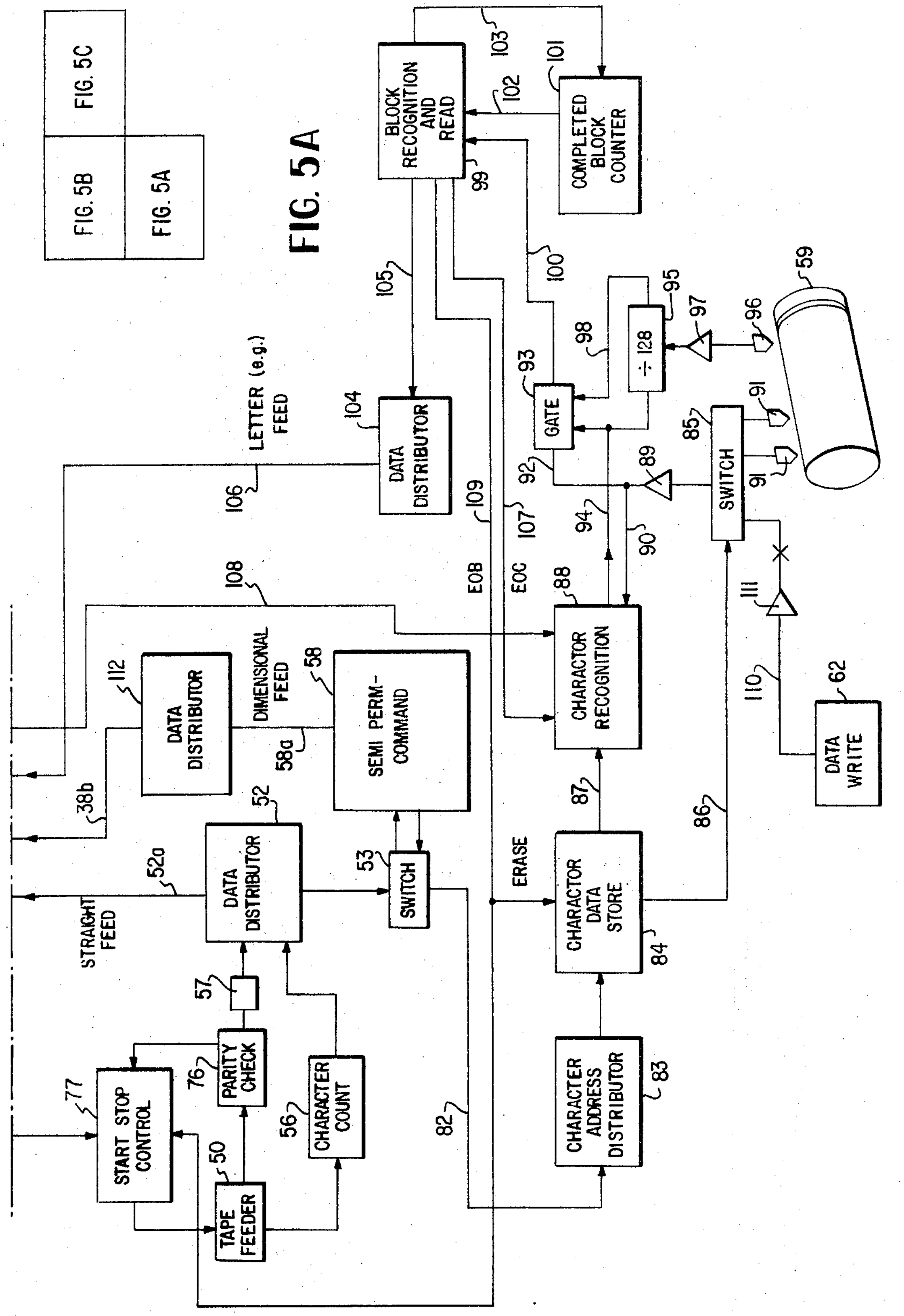
Figure 5B:
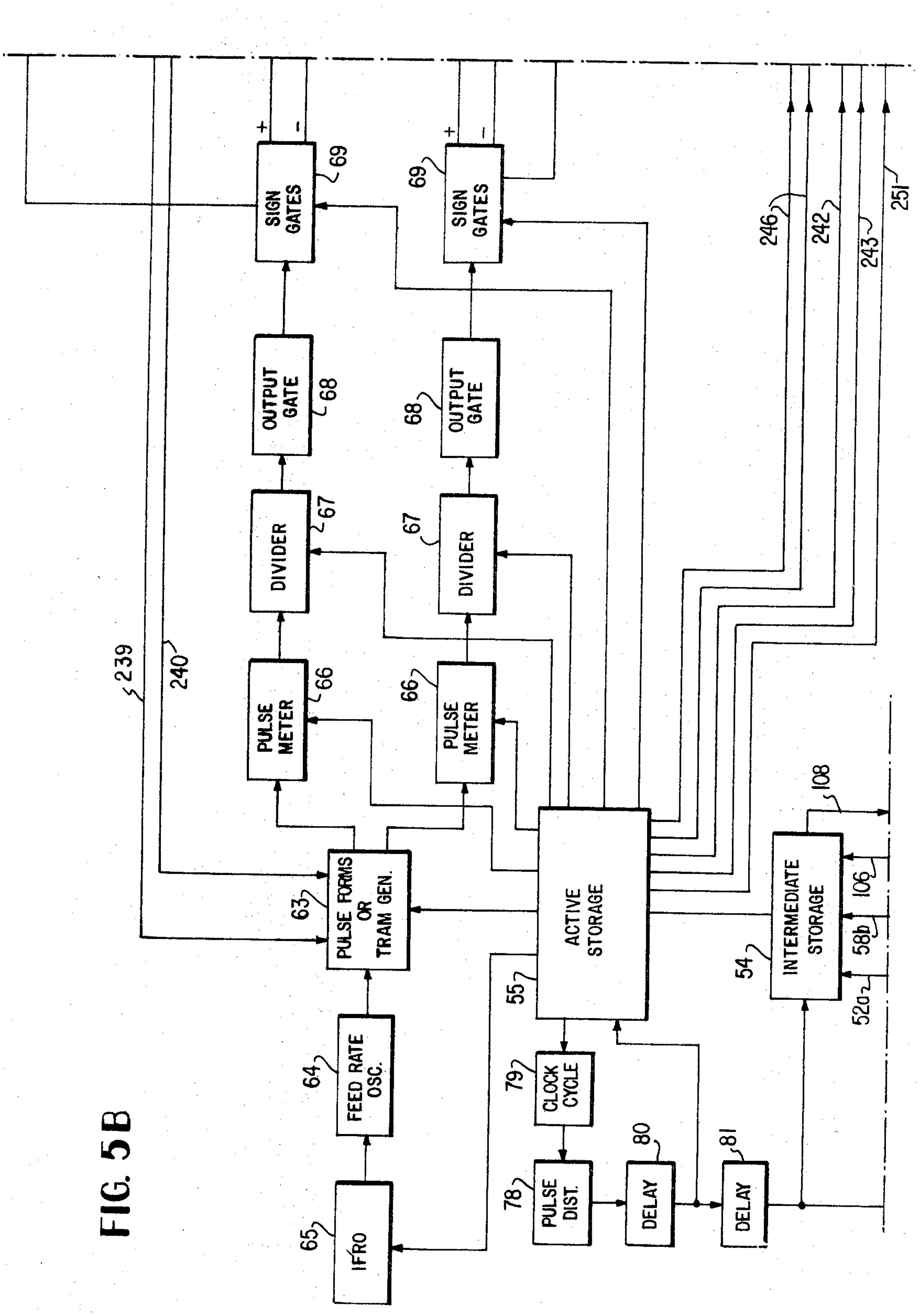
Figure 5C:
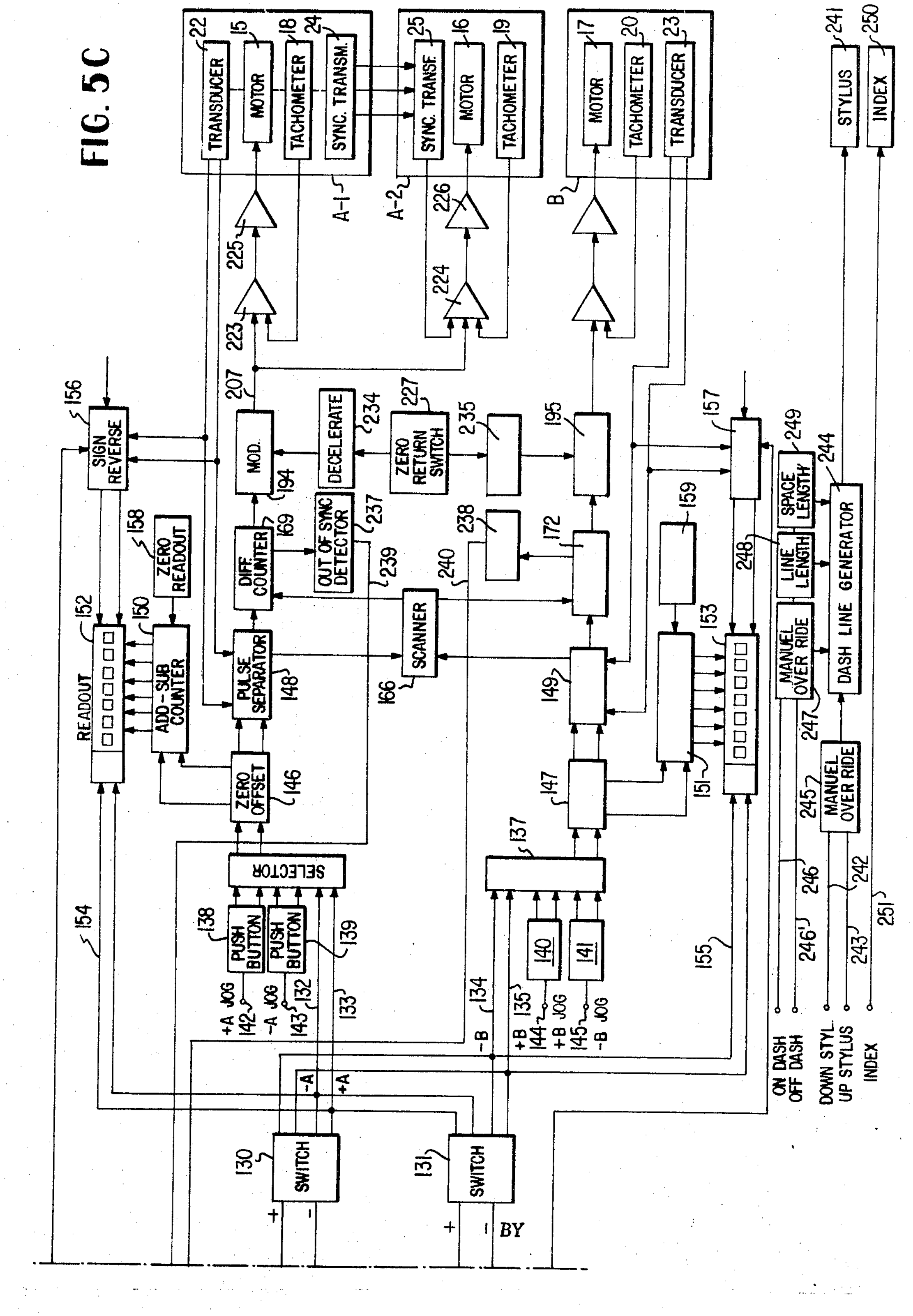
Figure 6:
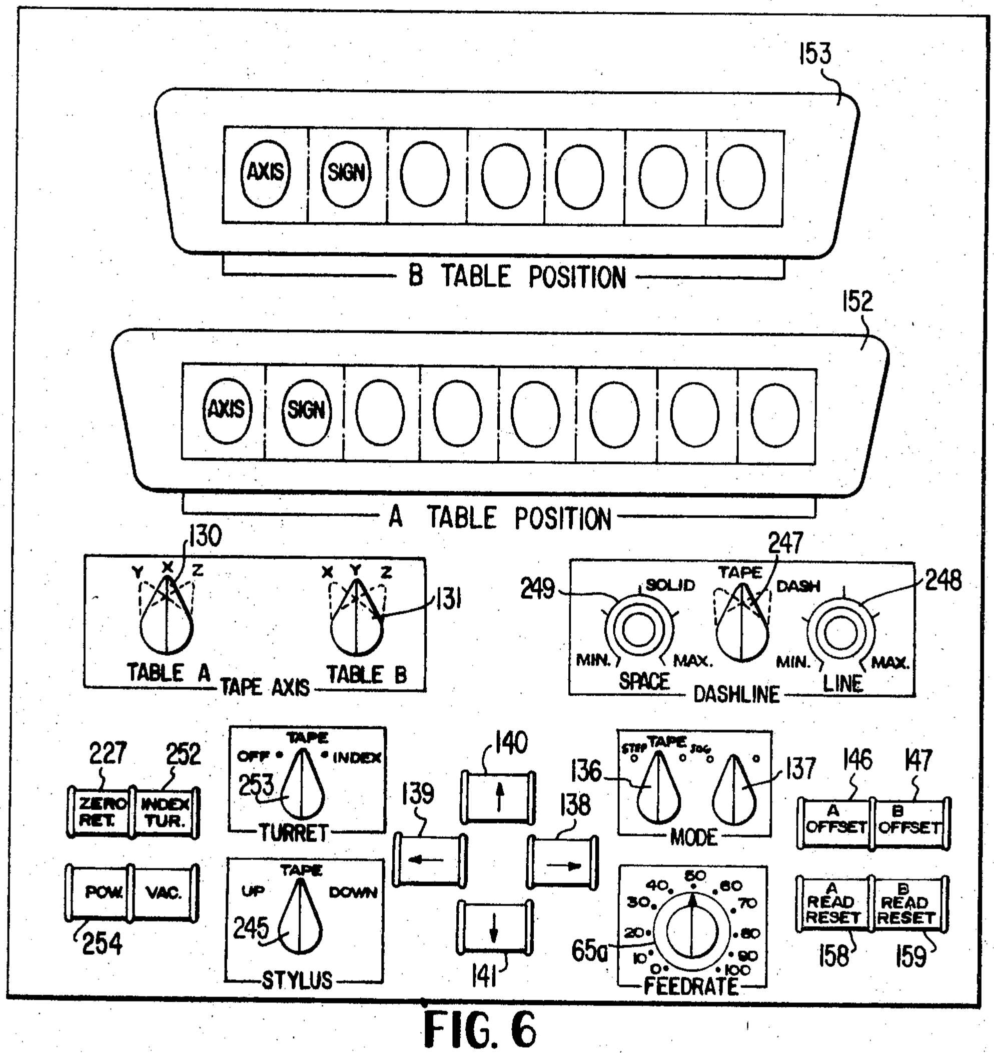
Figure 7:
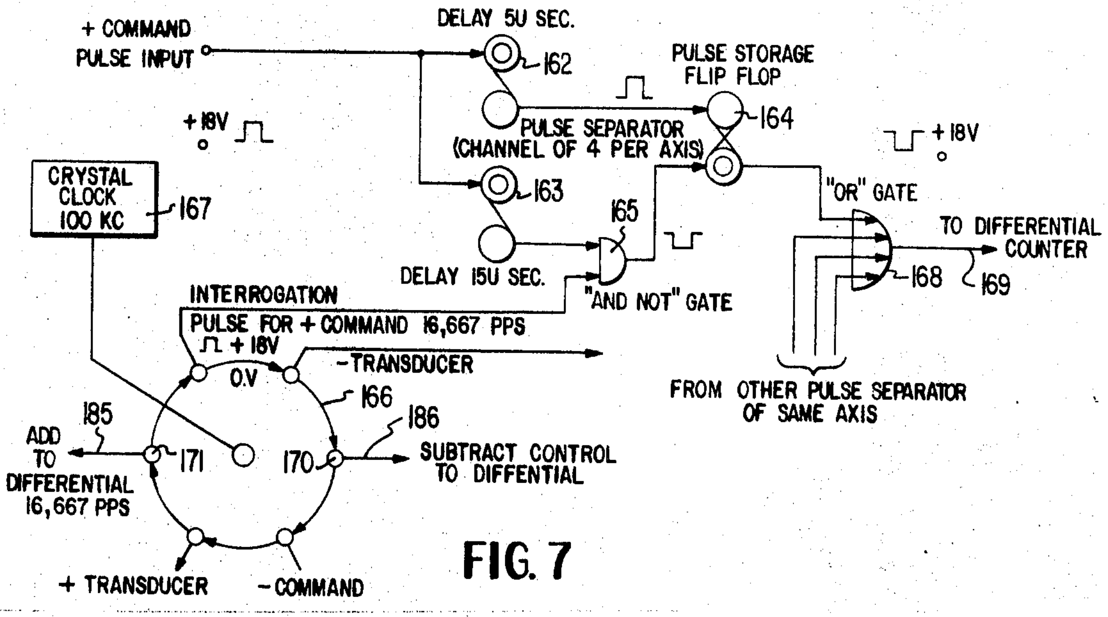

FIGS. 5A, 5B and 5C, viewed together, illustrate in block diagram form the electrical system of FIG. 4 in greater detail;

FIG. 6 is a fragmentary view of a control panel showing part of the controls employed;

FIG. 7 is a detailed schematic diagram of a portion of FIG. 5C.

Figure 8:
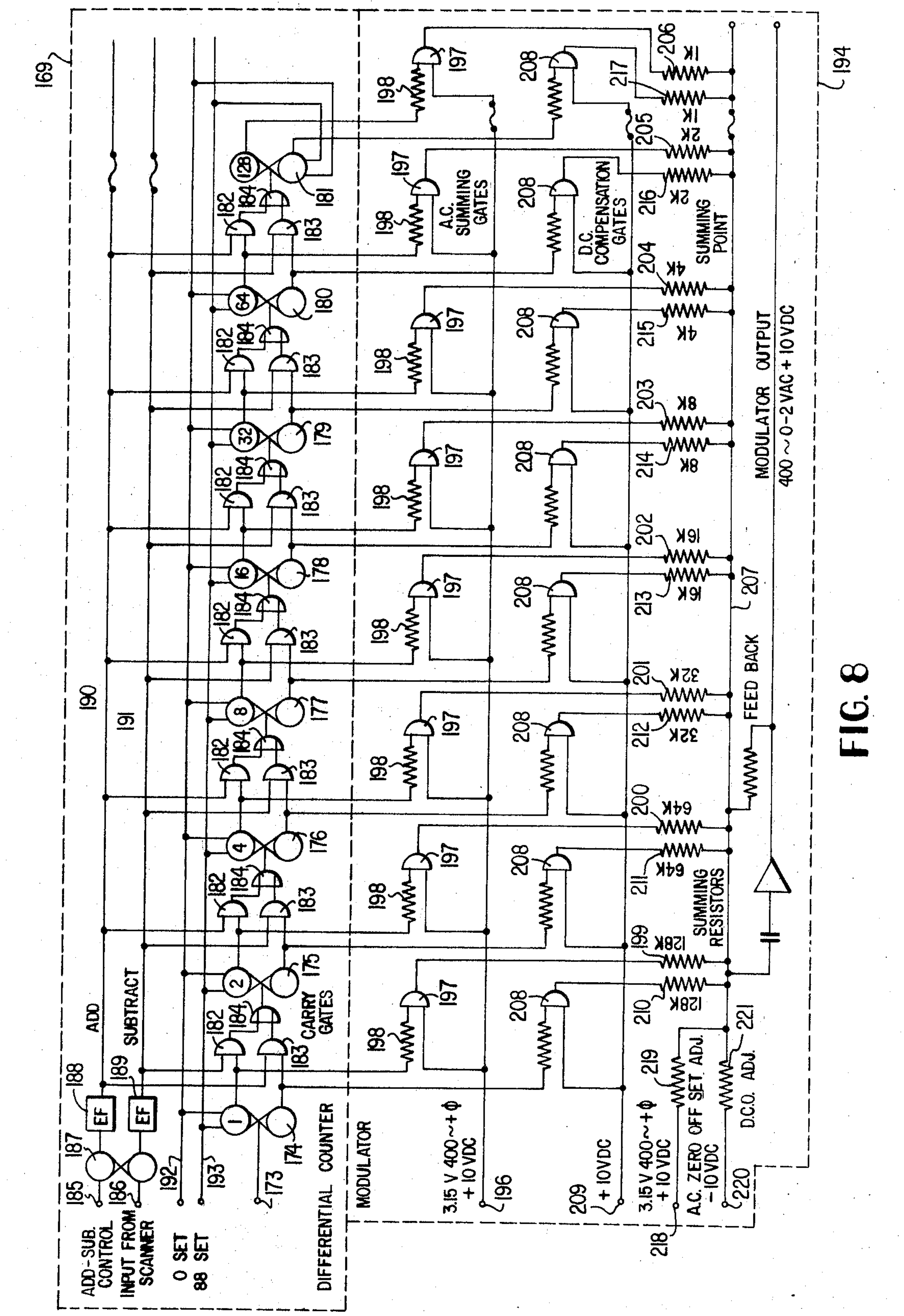
Figure 9:
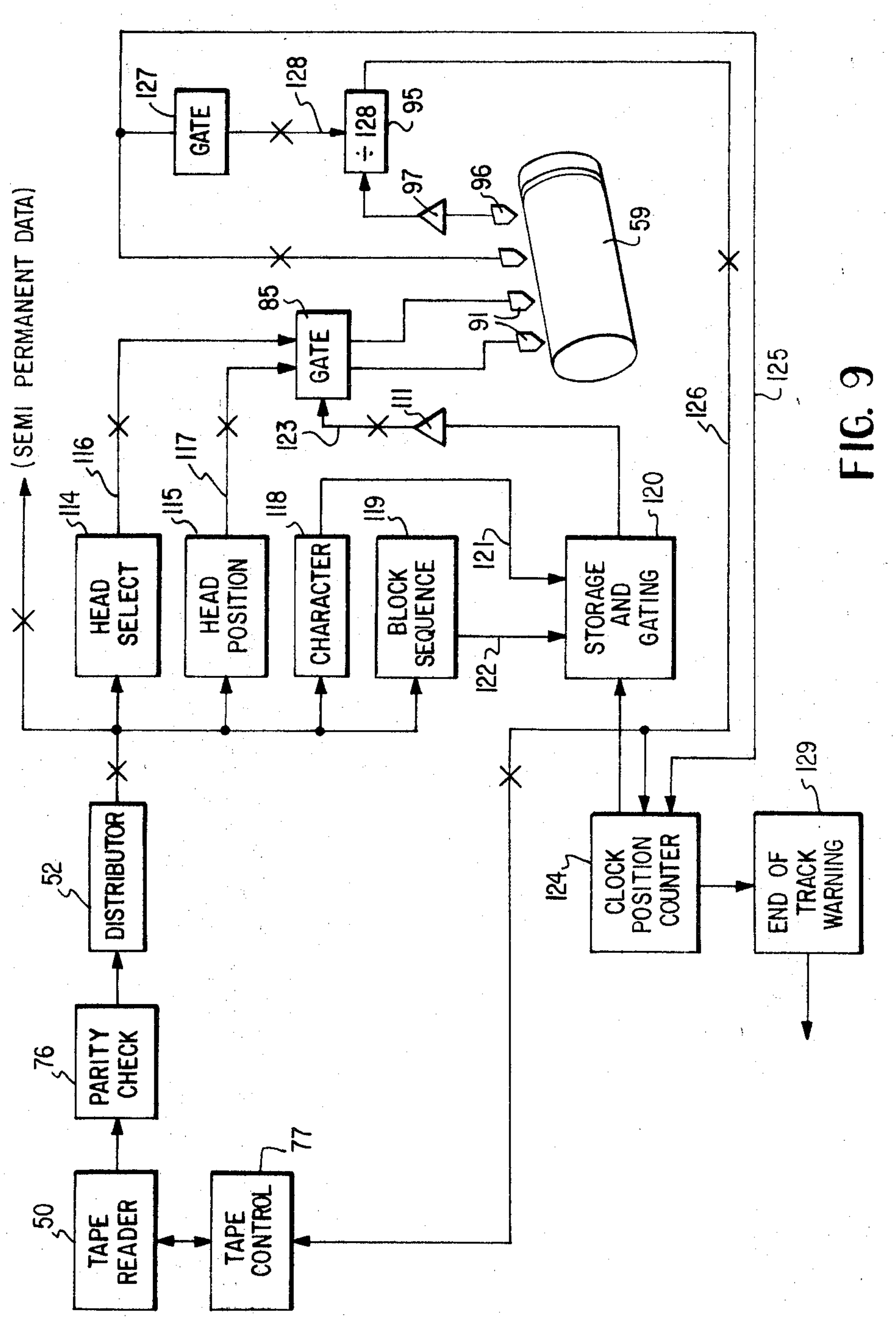

FIG. 8 is a detailed schematic diagram of a portion of the circuits shown in block form in FIG. 5C; and FIG. 9 is a block diagram of a drum program input electronics.

GENERAL DESCRIPTION

A preferred embodiment of the present invention comprises an electronically controlled power driven drafting apparatus where the electronic control circuits include a numerical control continuous path or contouring control director for actuating and for commanding and controlling the direction of movement and rate of motion of a drawing tool. The numerical control director operates as a means for routing various command informational pulses obtained from various digital pulse sources such as magnetic or punched tapes, punch cards, manual input controls, manually manipulated input sources of pulse information, to an output system electronics control circuit where the information from the numerical control director is used in combination with digital information received from transducers mounted so as to move with the drawing tool for correlation purposes to be converted into analog signals to drive the drawing tool during a drawing operation.

Figure 1:
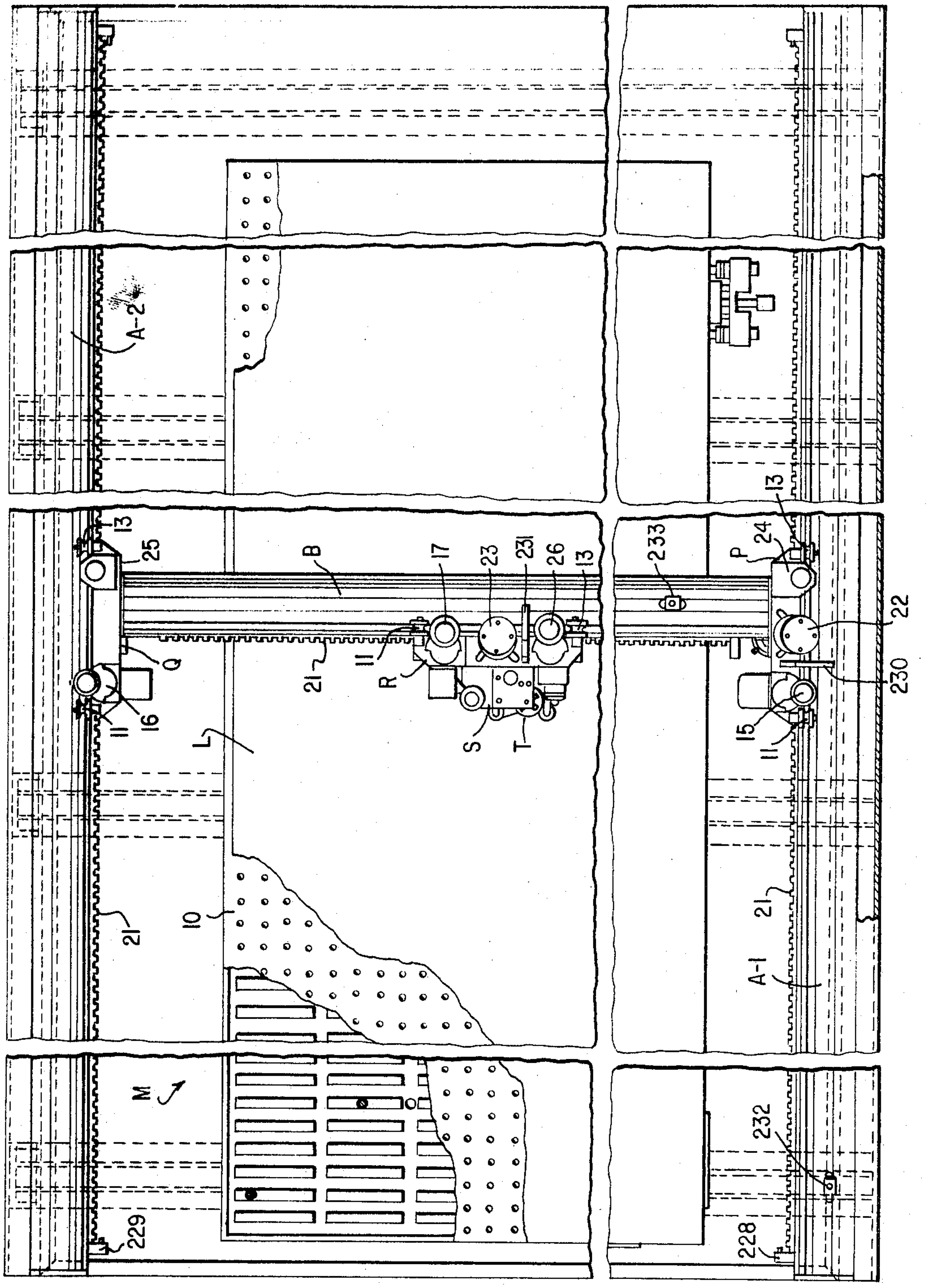
FIG. 1 is a plan view of an automatic drafting machine forming a part of the preferred embodiment of the present invention.
Figure 2:
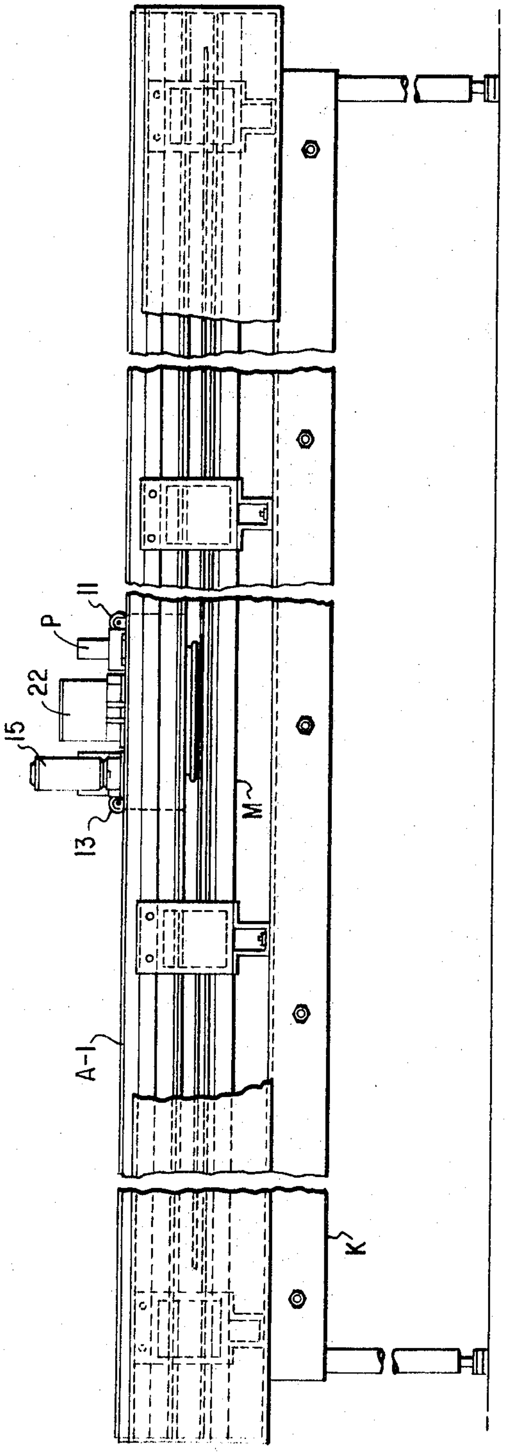
FIG. 2 is an elevational view, with portions broken away, of the controlled apparatus shown in FIG. 1, looking from the lower side of FIG. 1.
Figure 3:
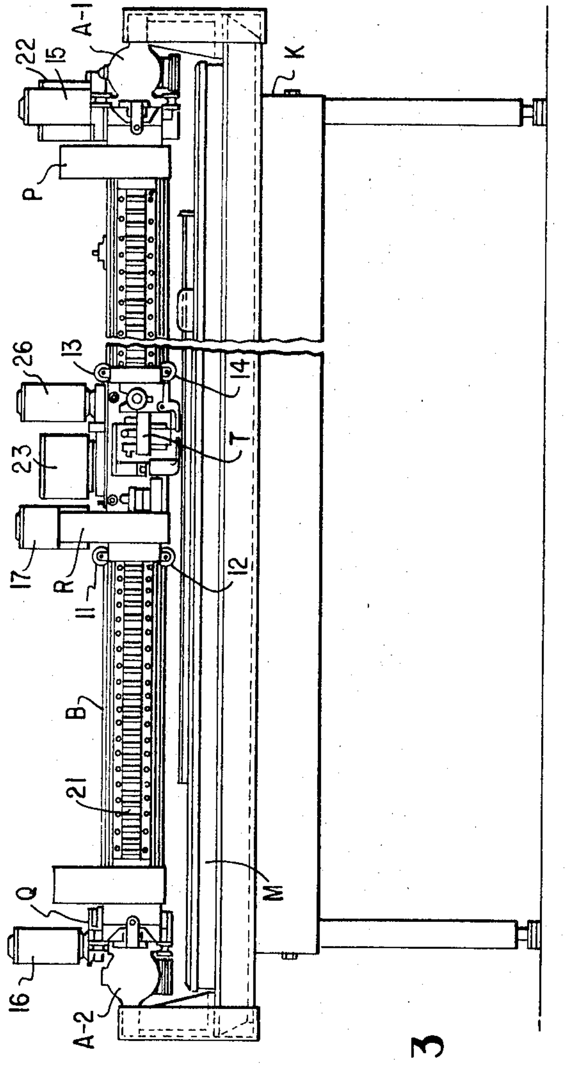
FIG. 3 is an elevational view of the controlled apparatus shown in FIG. 1, looking from the left side of FIG. 1.

Referring now to FIGS. 1, 2 and 3 of the drawings, the electromechanical features of the automatic drafting apparatus are shown comprising a drafting table assembly K supporting two runway beams A1 and A2, also referred to as the A1 and A2 beams; the beams A1 and A2 are supported at the top and bottom edges of the table K as seen in FIG. 1. A third beam B, also to be referred to as the B beam, is shown supported in two carriages P and Q where the carriages are supported by the A1 and A2 beams for longitudinal movement along the beams. A third carriage R is supported on the B beam and is mounted for longitudinal movement along the B beam.

A complete disclosure of the table, of the beams and of other mechanical features pertaining to this automatic drafting apparatus are fully disclosed and explained in our copending application Ser. No. 540,123 filed Mar. 2, 1966. The description that follows is given just for the purpose of orienting the reader with respect to the apparatus that is directly controlled by the electronic systems to be described subsequently.

The carriage R is provided with a stylus head S, including an indexable turret T having a plurality of marking styli such as pens, pencils, scribers, engraving tools and the like supported therein and selectively movable into an operative position and further selectively engageable with a drawing supported on the table K by moving a chosen stylus into and out of the plane of the paper as suggested in FIG. 1.

The material L to be marked is supported on the marking surface M of the table K and may be held on the marking surface in any conventional manner; in the preferred embodiment of the present invention, the material to be marked is held on the surface M by a vacuum chuck 10.

The carriages P, Q and R are supported for movement on their respective beams by a plurality of ball-bearing rollers 11, 12, 13 and 14, having suitably shaped threads for engaging with the runways on the beams. The carriages P, Q and R also act as supports for their respective drive motors 15, 16 and 17 which, in the preferred embodiment, are two-phase alternating current motors operating off of a 400 c.p.s. signal source. These motors are utilized to drive the carriages along their respective beams and thus move the scribing tool over the material L. It will be obvious to those skilled in the art that the drawing tool can be moved in any direction in two dimensions and thus can be made to draw curved lines, dashed lines, straight lines and the like. It should be equally obvious that the tool can be made to move in three dimensions by adding a fourth beam connected for movement along the B beam and arranged perpendicularly thereof where said fourth beam would be the beam along which the carriage R would be mounted for movement.

Each of the motors 15, 16 and 17 is respectively provided with tachometers 18, 19 and 20 shown in block form in FIG. 5C of the drawings for the purpose of stabilizing the system against overshooting or hunting. The tachometers provide a dampening effect so that if at any time command information to the motors 15, 16 and 17 is suddenly interrupted, the stylus will not overshoot the position called for by the last given command signal. Tachometers are necessary to provide a high degree of accuracy and stability and, in the preferred embodiment, were 400 c.p.s. tachometer generators. They were deemed to be necessary in that if command information is received by the motors 15, 16 and 17, calling for a sudden change in direction of the drawing tool, such a change would necessarily produce a curved line as opposed to a sharp corner in the absence of the tachometer generators 18, 19 and 20. By utilizing the tachometers, a command from the system electronics is made slower or interrupted to allow time for the stylus head S to reach the corner before the direction of movement is changed. Each of the beams A1, A2 and B is provided with precision racks 21, and the tachometer generators 18, 19 and 20 are connected to the precision racks 21 by suitable gearing including precision pinions, not shown in the present application but shown and described in our copending application. The pinions are in mesh with the upper portions of the racks 21.

Carriages P and R are provided with digital incremental position transducers 22 and 23 of the type disclosed in our patent U.S. 3,009,141, issued Nov. 14, 1961. Transducers 22 and 23 are connected to the racks 21 by gearing including precision pinions, not shown, in mesh with the lower parts of their respective racks 21. Digital transducers 22 and 23 provide a continuous indication of the position of their respective carriages, which information is utilized by the system electronics in combination with data input information for the purpose of controlling the movement of the carriages P, Q and R by their respective driving motors and thus controlling movement of the scriber head S.

The manner in which the signals from the transducers 22 and 23 are utilized by the system electronics will be described subsequently and it is sufficient for general purposes at this point to simply say that the transducers 22 and 23 provide positional data to the system electronics and further they provide information relative to the change of position in digital form to the system electronics.

The carriages P and Q are also provided with a synchro system, a synchro transmitter 24 being mounted on the P carriage and geared to the rack 21 on the beam A1 while a synchro receiver 25 is mounted on the Q carriage and geared to the rack 21 associated with beam A2. The synchrosystem is utilized to maintain a constant working coordination between the carriages P and Q by keeping them aligned with each other. In the preferred embodiment of the present invention, command information for the operation of the motors 15 and 16 is received over the same electronics systems channel and thus the synchrosystem operates as a further check to maintain coordination even though the signals, in theory, to the two motors 15 and 16 would be the same. It would, of course, be obvious to utilize separate drive chaniels for each of the motors 15 and 16 but in such a case, a synchrosystem would become absolutely necessary to maintain coordination between the carriages P and Q on their respective beams; otherwise, error could easily result in the final drawing in that the B beam could become canted or offset from a perpendicular relative to the A beams.

The carriage R is further provided with a mechanical inertial balancer 26 which in the preferred embodiment is utilized to compensate for the difference in weight between the A and B assemblies. The inertial balancer 26, as shown, comprises a cylindrical fly wheel of suitable weight connected to the rack 21 associated with the B beam by gearing, including a pinion, engaging the upper part of the rack. When the carriage R is moved back and forth along the B beam, the fly wheel rotates and provides an inertial balance serving to compensate and make the moments of inertia of the B assembly equal to or look like the moments of inertia of the movable A assembly.

The beams are provided with movable stops for limiting the movement of the carriages. These stops were provided in the preferred embodiment for the purpose of establishing a numerical position on the drafting surface M and in the preferred embodiment, the table or surface zero was chosen as the lower left-hand corner of the table.

ELECTRONICS DESCRIPTION—GENERAL

Referring now to FIG. 4, the system electronics for an embodiment of an automatic drafting machine or the like is shown in block diagram form. A source of data input 50 may be any of several sources of digital information such as a paper or plastic punch tape, magnetic tape, magnetic discs and the like. It may also be any source of mechanically operated devices such as a keypunch input utilized in conjunction with a data processing and computating device. The output of the data input device is connected to the input of a data distributor 52, the output of which is connected to a switch 53 or an intermediate or buffer storage 54 depending upon the information fed into the data distributor from the data input device 50. The buffer storage 54 and the active storage 55 are actually incorporated as parts of a numerical continuous path or contour control director and form no part of this invention, although they are fundamental to the operation of this invention. One embodiment of the present invention utilized a director similar to that employed as a contouring control for machine tools and in particular a TRW–3000 control system or director produced by Thompson Ramo Wooldridge, Inc.

Because of the interoperation of the numerical control director with its input and output circuits and the automatic drafting machine, some explanation of the interoperation of the buffer storage 54 and active storage 55 with the input and output circuits thereto is deemed necessary.

The data distributor 52 has the function of routing all characters making up a particular word, which would operate as the whole of a given input, to the various use circuits of the system. Therefore, the data distributor must be of the type that routes information to the buffer storage and because of the fact that other storages are incorporated in the system, it must also have the ability to distinguish inputs to be sent to the buffer store from inputs to be sent to and control other storage devices in the system. The data distributor 52 consists of a plurality of gating circuits which are set in operation through a character counter 56 operating off of the data input 50 and a code converter 57 which also operates off of the source of external input 50. The converter 57 may not be necessary to some embodiments of this invention, its necessity being dependent on the code used.

The character counter 56 may consist of cascaded ring counters each counting up to 5 and, therefore, in the aggregate counting up to the product of the number of ring counters. The character counters are driven by the input and, if the input is a tape reader, as is utilized in the preferred embodiment of the present invention, receive a pulse for each increment of motion of the sprocket wheel of the reader. The output from the character counter 56 is applied to control gates in the data distributor 52 allowing one gate for each count. For the purpose of a drafting instrumentality motion commands for the motors on each of the carriages P, Q and R, would be in either the plus or minus direction and would require four sign gates in the data distributor 52 which gates would, of course, be single gates. A numeric control digit is also read out from the data input source 50 and if that source is a tape reader, would consist of bits of information determined by holes or lack of holes in a punched tape. This information will consist of a specified number of digits such as six digits for each of the signed numbers which specify the magnitude of motion and the distance to be travelled along each of the coordinate axes of an imaginary cartesian system on the drawing table M. The character counter 56 must count the information stored in the tape input and set up the data distributor 52 for the purpose of transferring this information to the buffer storage 54 or to other storages. The data distributor 52 includes numeric gates, the number of such gates being determined by the number of axes utilized or available on the drawing table, and it has an additional group of gates, the number of which depends on the numbers and signs that must be employed to operate additional storage and command apparatus and circuits in the system.

At the same time, input from the tape is converted into a series of pulses in the code converter 57 which pulses are applied to the data distributor 52 in conjunction with counter 56's input in order to operate the selected distributor gates. When there is a coincidence of information from the character counter 56 and the code converter 57, then those gates at which coincidence occurs in the data distrbutor 52 are available and transmit or transfer information to the buffer storage 54 or other storage control circuits upon a command from the buffer store or other circuits to the effect that they are ready to receive information from the data distributor 52.

The buffer store 54 typically consists of a specified number of flip-flops in one embodiment of this invention. In order that the tape reader or source 50 has direct command over the motor 15, 16 and 17 and the stylus head S, etc., then information from the selected gates of the distributor 52 would be transferred directly in serial fashion to "set" corresponding flip-flops in the buffer storage 54. In practice, there is a single gate for each of the sign numbers in the data distributor 52, and there is a corresponding flip-flop in the buffer store. In a like manner, the number of gates utilized for numeric control would be equalled by the number of flip-flops in the buffer store. When the flip-flops in the buffer store 54 are reset (to zero), then this information is applied to the gates in the distributor and information contained in the data distributor is transferred to the buffer store, thus setting selected flip-flops in the buffer store 54 to a set or "ones" condition. Information thus is transferred in block form from input source 50 setting up the gates for one block, which block would be transferred to the buffer storage 54. During this process, the data input source 50 would stop transferring information until it receives a command that transfer has been complete to the buffer store 54 and that the data distributor 52 is then ready to be reset or has been reset and is ready for the next block of input information. This function is conveniently accomplished by feeding back information from the character counter 56 to the input source 50 as command information for controlling the starting and stopping of the source of input data.

As is shown in FIG. 4 of the drawings, buffer store 54 also receives two other sources of input, one from a semipermanent storage 58 and the other from a drum storage 59; these two latter storages are utilized for special purposes which will be discussed subsequently.

The buffer storage holds its flip flops in a set condition during the period when previous information read out from the buffer store by the active storage 55 is being utilized by the drafting machine's electronics input circuits for drawing purposes. The active storage consists of a plurality of flip-flops parallel to the flip-flops in the buffer store and when the active storage 55 has completed the transfer of information to the drafting instrumentality, its flip-flops are reset to a zero condition. The buffer store 54 is notified of this fact and that the active storage 55 is ready to receive new data whereupon the buffer storage will transmit its new set of information to the active storage, thus setting selected flip-flops for read out.

The ring counters, gates and storage flip-flops may be of any well known design since they are completely conventional and no further description of them is deemed necessary.

The character counter 56, code converter 57 and data distributor 52 also have a plurality of circuits of the type heretofore described which are utilized for the purpose of setting the switch 53 into either of two output states; the first output state being such as to switch the data distributor through to a semipermanent storage 58, the second output being such as to switch the drafting instrumentality over to the control of a drum storage 59.

The semipermanent storage 58 will be described in greater detail subsequently, but in one embodiment of this invention it consists of a switching matrix of any conventional design which matrix is set for a sequence drawing operation; a sequence drawing operation could consist of a single drawing or a group of drawings in a set. Information stored in the switching matrix 58 consists of scaling information for the drawing, axis information, sign information, and a command circuit for changing the position of the switch 53 into a condition to transfer input or command information through to the drum store 59.

The drum storage 59 is switched on to read out information into the buffer storage 54 upon the command for switch-over from the data input source 50. The drum storage 59 stores two types of information as follows: The drum can be programmed for directing the automatic drafting machine to draw a series of standardized symbols such as letters, mechanical symbols, electrical symbols and the like; the storage 59 is also programmed with the individual commands nescessary to command the machine to draw the particular symbols selected.

The command to switch over to the drum store 59 and to read out information from the drum in accordance with an input signal, that is, a punch tape read by the tape reader 50 carrying command information calling for a particular symbol to be read out of the drum store 59 and to be drawn by the drafting machine, necessarily requires a corresponding number of gates in the data distributor 52 associated with ring counters usable for this purpose in the character counter 56 and consequently requires that the drum input electronics be similar in nature to a buffer store for the purpose of commanding the drum storage 59 to look for the particular letter or character desired and for matching tape speed to drum speed. The input electronics which will be described in more detail subsequently has been designated as a block 60 in FIG. 4. Information read out of the drum store is transferred into the buffer store 54 for subsequent transferral to the active storage 55 to be utilized to command to the drawing instrumentality. In connection with this transfer of information process, the output electronics from the drum storage 59 has been designated as drum output electronics 61 in FIG. 4.

Depending upon the use situation to which the drafting machine is to be subjected, that is, the requirements of a user, the drum store 59 may be set up to permanently retain information to be used by the drafting instrumentality or it may be equipped with a second drum input 62 for the purpose of changing the program stored on the drum.

The active storage 55 is connected on its output end to a number of circuits which circuits are commanded by the active storage to produce or draw a desired configuration. The active storage 55 directly controls a pulse train generator 63 which generator emits a series of pulses, the number of which is controlled by the active storage. The generator 63 is basically a differentiator and is gated by the active storage. A feed rate oscillator 64 is connected to another input of the generator 63 and supplies a square wave to the generator. The leading and trailing edges of the square wave are differentiated by the generator to produce the pulse output from the generator. The feed rate oscillator is a master oscillator and in the preferred embodiment is a free running multivibrator operating at a frequency of 100 kilocycles per second. This frequency is variably controlled by an information feed rate oscillator 65 connected to the oscillator 64. The IFRO 65 is manually controlled and is used to control the speed of the machine or that is, the rate at which the pens, scribes, or the like are moved. The frequency of the IFRO information feed rate oscillator, 65 is controlled from the front panel through the adjustment of a control knob **65*a*; see FIG. 6. In the alternative and in the preferred embodiment the IFRO 65 may operate as a code converter under the control of the active storage 55. Its function remains the same, i.e., to control the frequency of the FRO 64** and thus the speed with which the machine produces a drawing.

The output of the pulse train generator 63 is applied to a plurality of pulse meters 66 there being one pulse meter for every axis along which the drafting pens, etc. of the drafting instrumentality may move. The pulse meters 66 may be any conventional ring counter and they count the number of pulses produced by the generator 63. The active storage 55 controls the pulse meters for the purpose of setting them to receive a number of counts; the number being in accordance with the setting of the flip-flops in the active storage. The ring counters are reset to zero prior to the transfer of a new block of information into the active storage from the buffer storage 54.

The pulse meters 66 are connected to the input of a group of dividers 67; the number of dividers 67 being dependent upon the number of drawing axes and for the purposes of explanation, only two dividers have been shown. The dividers may be, and in the preferred embodiment of this invention are, a series of flip-flops set to lower the frequency rate of the pulse meters from 100 kc. to 20 kc. The dividers 67 have to reset input activated by the active storage 55 and are reset when the active storage is ready to receive new information.

The output of the dividers 67 is connected to the input of a plurality of gates 68 which are used to control the feed of numeric information to be transferred to the digital to analog converters of the drive electronics for the drafting machine. The gates 68 are connected to the input of a series of sign gates 69 which may be conventional AND gates having their other inputs connected to the output of the sign flip-flops in active storage 55. Numeric control information from the gates 68 is conveyed to each of the sign gates for a particular axis. However, only the plus or minus gate determined by the setting of the sign flip-flops in the active storage 55 is opened to transfer information to the motors 15, 16 and 17 command electronics.

The pulse output from the gates 69 is applied in parallel to the motor electronics which has for convenience been shown as two input blocks, one for A beam movement and one for B beam movement. The A beam input has been represented as A command electronics 70 and the B beam input electronics has been designated as B command electronics 71. It is in the command electronics that the pulse information is utilized for conversion into phase modulation signals to be utilized for the purpose of driving the motors 15, 16 and 17 on the A and B beams as represented by the blocks 72 and 73 in FIG. 4 of the drawings. The drafting apparatus electronics 70, 71 is provided with feed back information from each of the beams which has been represented as position electronics block 74 for the A beams and position electronics block 75 for the B beam. This information is digital and is utilized by the machine electronics for the purpose of correlating the position of the movable carriages P, Q and R with the position to which they were directed by the active storage 55. Thus, an error compensating feature is built into the drafting machine and it automatically corrects the movement of the carriages P, Q and R to provide a high degree of accuracy. The table electronics will be described in detail subsequently.

The active storage 55 also is set up to read out auxiliary command information to auxiliary command electronics 76 which controls the indexing of the turret T and the selection of a drawing tool in the stylus head S on the automatic drafting machine; the stylus head S and turret T have been represented by the block 77 in FIG. 4 of the drawings.

DETAILED DESCRIPTION OF SYSTEM ELECTRONICS

Referring now to FIGS. 5A, 5B and 5C, the system electronics for the automatic drafting machine is shown in detailed block diagram form. For the purpose of convenience, numeral designations from blocks described with respect to the general description of overall operation given in conjunction with FIG. 4 have been carried over into FIG. 5.

In the preferred embodiment of this invention, all movements and all control channels will be described with reference to movement along either of two axes as defined by the directions of movement of the carriages P and Q along the A beams and of the carriage R along the B beam. Therefore, for the purpose of discussing tape codes and electronics control circuitry, the description will be confined to a code and circuitry capable of handling movement along two axes. It, of course, will be understood by those skilled in the art that the circuits and codes involved can be easily expanded to handle other axial movements including movement along a Z axis and in a rotary coordinate system.

Tape reader 50 in the preferred embodiment of this invention reads a punched paper type utilizing a 1–1–2–5 binary-decimal code where each decimal digit is represented as the sum of 4 weighted binary "bits." The paper tape is cut with eight transverse holes plus a clock hole for reading purposes. The first digit to be read by the tape reader would be the sign followed by the number of digits required for motion in an X direction, or that is along the A beams. The units of magnitude of motion represented by a binary-decimal number may conveniently be ten-thousandths of an inch. Thus, the largest motion which a single command can call for in either the plus or minus X direction would be 9.9999 inches. The seventh column on the tape would require motion in the Y direction, that is, along the B beam and would be the sign Y command followed by the five numeric indicators for motion in the Y direction. The remaining transverse holes of the paper tape may be utilized for the purpose of checking the coding of the paper tape while the remaining two holes may be utilized for the purpose of directing channels.

A conventional parity check feature is incorporated as shown in FIG. 5A as block 76. The parity check circuits 76 operate in the usual manner in conjunction with a tape start-stop control 77.

As previously mentioned, the digital output from the tape is serially read into the data distributor 52 by a character counter 56 and through the code converter 57 for the purpose of setting up the gates in the data distributor 52.

As an example, a command may conveniently consist of 25 digits utilizing a total of 12 digits in each of the signed numbers X and Y, the 25th digit being utilized for clock cycle timing purposes. If a command consists of 25 digits as stated, then the character counter should be able to count up to five utilizing each of two cascaded ring counters giving a total count of 25. Similarly, there would be 21 groups of the four numeric gates plus four sign gates in the data distributor for the purposes of routing information to the active storage 55. In practice, not all of the 12 digits are utilized for each of the X and Y command and consequently some of the gates are available in the data distributor 52 for the routing of information to the semipermanent command matrix 58 and to select the drum storage 59 as a means of controlling the drafting machine.

Referring briefly to FIG. 5B, whether command information comes to the active storage 55 directly from data distributor 52 or whether it comes from matrix 58 or drum 59, the transfer out of the storage requires time and thus the active storage must be able to "tell" the source 50 and other circuits when it is in a reset condition and thus able to accept new data. This function is handled for direct transfer purposes by a feedback loop consisting of the active storage connected in series with a clock cycle 79, a pulse distributor 78 connected in two delay units 80, 81 connected to the pulse distributor and in series with each other and to the tape reader 50's start-stop control 77. The delay units 80, 81 may be one shot multivibrators or their equivalent. Thus, when a pulse is emitted by the pulse distributor 78 upon the completion of transfer of information out of the active store 55, this pulse is applied to the delay unit 80 and is utilized to reset the active store 55. After the flip-flops in the active store have been reset, information contained in the intermediate storage unit 54 can be transferred in parallel to the flip-flops in the active store 55. Following another delay created by the delay unit 81, the pulse from the pulse distributor 78 will be applied to the intermediate storage 54 to reset its flip-flops, thus allowing the same pulse to be applied to the start-stop control 77 for the purpose of advancing the tape reader to the next block of information on the coded paper tape. It may be desirable to introduce another delay unit in series with the delay unit 81 and placed prior to the start-stop control unit 77 in order to insure the transfer of information from the intermediate storage 54 to the active storage 55 before the tape reader 50 moves on to the next block of input information. The delay units should provide ample time for the resetting of each of the storages 54 and 55 before the transfer of new information into each of these storages.

The clock cycle 79 is set in accordance with a coded designation applied to the active storage from each block of information transferred into it. Upon being set, the clock cycle operates the pulse distributor 79 to generate a pulse which in turn is utilized as heretofore described.

Since the director utilized in the present embodiment of this invention is not part of this invention but is in fact a purchased unit as heretofore stated, it is felt that no further description is necessary with respect to the transferral of information through it. It is sufficient to say that transferral of information into the active storage it utilized to form pulse trains in each of the information channels shown in FIG. 5C necessary to the production of a drawing by the automatic drafting instrumentality. Only two channels have been shown in FIG. 5B of the drawings although, as heretofore stated, the number of actual channels will be determined by the number of axes in any given coordinate system along which it is desired to move a stylus.

One of the primary considerations that must be taken into account in the production of any drawing is the fact that standardized symbols and lettering necessarily must be added to the drawing. To meet this problem, the preferred embodiment of this invention includes permanent and semipermanent command storages to be utilized for the purposes of lettering and supplying standardized symbols on the drawing being made and to set the dimensions of symbols, choose axes and the like for the drawings. For this purpose, a pair of storages 58, 59 are provided in the preferred embodiment of our invention and the associated circuitry necessary to command the read out of information from these storages is also provided. To facilitate the handling of this information, either of two methods of selecting the particular symbols and particular letters to be read out of the storages 58, 59 may be utilized, as follows: A separate tape may be made for a set of drawings and whenever it is desired to letter and apply standardized symbols, select axes, etc. for such drawing or drawings in the group, this tape may be fed through the tape reader 50. On the other hand, the desired information may be programmed onto each tape utilized to command the production of an actual drawing. This latter method is, of course, more time-consuming than the former and thus, in the present embodiment of this invention, the method of utilizing a separate tape for a series of drawings is preferred.

Referring now to FIG. 5A, the data distributor 52 has been previously mentioned as having a plurality of groups of gates which may be utilized to transfer information along a line 82 to a switch 53. The switch 53 is a transistorized switch that in its normal biased condition permits the transfer of information to the semipermanent command switching matrix 58, which information is transferred to buffer store 54 through a data distributor similar to data distributor 52 over lines 58A and 58B. The first information that is read by the tape reader 50 pertains to the dimensioning of the symbols and letters and to the X axis and Y axis feed rates. Under the standardized code utilized with respect to drawings, a command of draw-60 (*d*–60) is utilized by the semipermanent command switching matrix 58 to make the drafting machine draw the symbols at the fastest possible rate that it is capable of maintaining, and thus this command would constitute a feed rate bypass command in the X direction; in a similar fashion, a drawing code designation *d*–61 would indicate a feed rate bypass for the Y axis. These commands cause switches in matrix 58 to remove the feed rate oscillator 64, FIG. 4, from the control of the information feed rate oscillator 65 and therefore the feed rate oscillator will operate at its highest frequency. At the same time, clock cycle 79, FIG. 5B, is made to operate at its highest repetition rate, thus forcing the pulse distributor 78 to operate at its highest rates. This command yields the fastest read out of information from the drum storage 59 in the transfer of information out of the active storage 55. Similarly, the switching matrix 58 also can be commanded to switch particular read heads to be utilized in conjunction with the read out of the drum 59 and for selecting head positions relative to the drum. These last *d* codes are actually optional codes to be utilized by the operator in making his selection manually if he so desires with respect to read out from the drum; in practice, this information will usually be routed by switch 53 after the switching matrix has been commanded to transfer the input to a character address distributor 83 in the drum 59 input electronics.

In one embodiment of the present invention, the storage unit 59 was a purchased memory device made by the Bryant Computer Products Company and was their model C–105 drum. This drum can store up to 4000 bits per track and can carry up to 100 heads or tracks of information; in the preferred embodiment, only eight heads and eight tracks are used. The drum rotates at a speed of 1800 r.p.m. and transmits pulses at the rate of 72,000 cycles per second. Since this speed is not appropriate for the digital circuitry utilized in the drum read out electronics and the director, a counting circuit 95 has been added to match the drum information output rate to the information processing rate of the output electronics. The counter 95, which will be discussed subsequently, counts bits recorded on a pre-recorded clock track on the drum and, in the preferred embodiment, after a bit has been read, the counter 95 counts to 128 causes the reading of the 128th bit and each 128th bit thereafter. Therefore, in practice, 3,839 bits per track are utilized, representing 30 bits per revolution with a shortage of one bit. Thus, after 30 revolutions of the drum, all of the bits of a track will have been read but not at a 72 kc. rate, rather at a rate of 900 pulses per second, which is within the information processing capability of the director.

After the command switching matrix 58 has set up the axes, dimensions and feed rate, and switched tape reader 50 over to the input electronics for storage 59, the tape reader reads in coded letters, symbols and the like which are coded in standard EIA codes to a character address distributor 83 connected to the switch 53. The character address distributor 83 consists of a series of gates similar to data distributor 52 which are selectively activated by the character counter counter 56 and code converter 57, if the latter element is used, in the same manner as the gates in the data distrbiutor 52 are activated. Distributor 83 has four single sign gates, a number of informational gates equivalent to those in distributor 52, and has eight single gates for head or track selection. This information transferred to the character address distributor 83 is different in kind from that transferred through the data distributor 52 to the intermediate storage 54 in that it must first select the particular read head to be utilized by the drum electronics and the track to be read by that particular read head. Following this, information as to the letter or character to be read is serially fed into the character address distributor 83 to set up selected gates. This information is transferred into a character gate store 84 (drum buffer) which may be any conventional storage matrix, such as a diode matrix, a flip-flop matrix or the like. In the preferred embodiment, a flip-flop matrix utilizing bistable elements is used having a series of single flip-flops for sign information and head selection purposes with numeric flip-flops corresponding in number to those utilized for processing information in buffer storage 54. The head selection flip-flops are used to activate a selected gate in a series of gates in a switch 85 connected to the distributor 84 by line 86.

The character data store 84 also transmits signals over its other line 87 to a character recognition unit 88. The character recognition circuit 88 consists of a matrix of coincidence circuits where coincidence circuits are of the type that generate a signal output upon the receipt of at least two inputs of equal valve. In the preferred embodiment, the character recognition unit 88 consists of a matrix of AND gates. The character recognition circuit 88 is connected to the drum 59 through an amplifier 89 and head select switching gates 85 by line 90. Information from the drum 59 is read out by a selected read head 91. This information is amplified in amplifier 89 and applied simultaneously over line 90 to the coincidence circuit 88 and over line 92 to an AND gate 93. When coincidence circuit 88 recognizes a bit under read head 91 or, i.e., a gate in the coincidence circuit is simultaneously activated by storage 84 and storage 59, then an output is applied over line 94 to gate 93.

Counter 95, which may be a ring of flip-flops or their equivalent, reads a timing track under read head 96 through an amplifier 97 to provide a pulse over line 98 to the gate 93 every 128th bit. Thus when equality is achieved in coincidence circuit 88 or, i.e., a letter or symbol is recognized, the gate 93 is opened every 128th bit with the counter 95 being reset to zero along line 94 by the circuit 88, and information is read out of the drum 59 along line 92 into a block recognition circuit 99 along line 100. The block recognition unit 99 consists of a matrix of AND gates which are selected in block groups by a conventional shift register 101 used as a block counter. Since symbols and letters are made up out of groups of blocks in the standard EIA code, e.g., 50 characters including the letters of the alphabet, numerals 1–0, and grammatical symbols such as commas, periods and the like require 393 blocks, a particular letter or symbol requires several blocks of information to completely draw the symbol, e.g., the letter R requires nine blocks. The block counter 101 functions over line 102 to sequentially energize a group of gates in the block recognition matrix where particular gates of the selected group are selected along line 100 to produce an output from the block recognition matrix 99. After a complete block of information has been read into the matrix 99, a signal is generated on line 103 and applied by the matrix 99 to block counter 101 to cause it to count up to the next desired block, thereby selecting a new group of gates to be energized selectively by drum 59.

As the gates in the block recognition circuit 99 are closed, they transmit output pulses to a data distributor 104 over line 105. Data distributor 104 performs like distributor 52 and is utilized to set selected flip-flops in the director buffer storage 54 over the 106. Information is serially transferred to buffer store 54 by the data distributor 104. Upon the completion of block read into the block recognition matrix 99, a standard end of block signal is transmitted by matrix 99 over line 107 to the coincidence circuit 88 to remove gate bias, thus closing gate 93. Upon the completion of transfer of information to buffer store 54, a transfer complete signal is transmitted over line 108 to the coincidence circuit 88 to restore gate bias, and the drum storage is now ready to read out the next block pertaining to the desired character, letter or symbol.

After all blocks for a particular character, letter or symbol have been read out of the drum, the block recognition matrix 99 transmits a signal over line 109 to the character data store 84 to reset all set flip-flops, and the signal is also sent to start-stop control 77 to cause the tape reader to advance the tape to the next character to be read out of the drum 59.

In some applications in which the automatic drafting machine may be employed, it will become necessary to erase the standardized characters stored in the drum 59 and replaces them with new information also standardized. A programming circuit 62 for the drum 59 is shown in FIG. 9 of the drawings in block diagram form. This write-in unit in the preferred embodiment is incapsulated so that it may be wired into existing circuits shown in FIG. 5A of the drawings. As shown in FIG. 5A, information transfer to drum 59 is carried out over a line 110, from the write-in circuits 62, through an amplifier 111, and switch 85 to the read-record heads 91.

In the preferred embodiment, a new tape is read by reader 50 with information transfer to distributor 52 as previously explained. The data write circuits are provided with a pair of plug-in lines 112, 113 where line 112 connects data distributor 52 to information write-in control circuits to be described below; line 113 is a connection line to link the switching matrix 58 with the information write-in control circuits. The programmed tape would have blocks of information similar to those in a drawing command tape.

The gates in distributor 52 are used to set up a pair of shift registers 114, 115. The shift registers 114, 115 are conventional flip-flop shift registers and obviously their equivalents may be substituted. They are connected to switch 85 by their respective plug lines 116, 117. Register 114 is used to select a particular read-record head 91 while shift register 115 is used to position the selected head 91 relative to a recording track on drum 59.

Information from the tape as to the character and blocks required for the character are transferred from distributor 52 into a pair of shift registers 118, 119 where these registers are also conventional flip-flops. The registers 118, 119 are connected to a fast access buffer storage 120 over their respective lines 121, 122. Buffer store 120 consists of a gated matrix of flip-flops where the flip-flops store character information in a series of blocks; the blocks being gated through amplifier 111 to switch 85 over plug line 123 under the control of block shift register 119 and a clock position counter 124. The gates in the buffer 120 are conventional AND gates and control the transfer of the blocks of information representative of a character set up in groups in the buffer store. For the 50 character grouping mentioned above, there would be 383 blocks and an equal number of AND gates in buffer 120.

The clock position counter counts the total bit information recorded on a selected track and consists of a conventional flip-flop ring counter. It is initially set to zero by a signal generated by a permanently recorded fiducial track on the drum 59 over plug line 125. Position counter 124 counts upwards in accordance with counter 95 to which it is connected by a plug line 126. Counter 95 divides the permanently recorded clock track on drum 59 into 128 counts and is reset by gate 127 over plug line 128 where gate 127 is operated by the fiducial track. Counter 95 is reset after it counts 128 bits.

Position counter 124 is set to count up to the total number of bits that can be recorded on any given track and is applied as the other input to block AND gates in buffer 120. At any given number of counts, prior to a fully recorded track, the clock position counter can give a visual output on a signalling member 129 to warn the operator that a track is nearly full. Thus, if the operator is punching the new code into a tape and the information is being simultaneously read by reader 50, he will be apprised of the necessity for punching in new track and head select data. During the transfer in of information, the counter 95 controls the start-stop tape control 77 over plug-line 126.

From the foregoing, it will be seen that the numeric control director receives input information from three different sources, namely, straight through information from the data distributor 52 over the line 52A, information from the switching matrix 58 over the lines 58A and 58B via a third distributor 112, and over the line 107 from the drum storage 59 via the drum output electronics. This information as stated heretofore is utilized for the purpose of forming pulse trains which are utilized by the table input electronics for the purpose of driving the carriages P, Q and R and operating the scribing tool to produce a drawing.

DRAFTING MACHINE ELECTRONICS

Referring now to FIG. 5C of the drawings, the director output consisting of a series of pulses in the positive or negative direction, depending on the selected sign gates 69, is applied to a pair of manual selector switches 130 and 131. The manual selector switches 130 and 131 are located at the operator's console (see FIG. 6). He has at his option the ability to direct the command information from the director to either the A beams, that is, to the P and Q carriages on the A beams or he can switch the input data over to the B beam and thus direct the movements of the R carriage located and driven along the B beam. The switches 130 and 131 are shown in FIG. 6 along with other control switches and metering panels which will be described in conjunction with FIG. 5C of the drawings.

As previously stated, the tape may have coded therein two or three axes information, for example, X and Y axis information or X, Y and Z axis information and the two switches 130, 131 on the control panel are provided for selecting which axis of tape information is used in the A axis of the table and which in the B axis of the table. The switches make it possible to select any view of the workpiece being drawn or to successively draw several views in different desired positions. The drafting machine can be provided with a rotating table section and the tape provided with rotational axes information, if desired. The switches 130 and 131 provide signals which control gating circuits in the director. By this method the need for unnecessary long leads carrying signals is obviated thereby reducing problems of stray noise.

Pulse data routed through the switches 130 and 131 occurs as a series of incremental command pulses which are utilized by the electronics shown in FIG. 5C of the drawings to move the various carriages a discrete distance for each pulse received. In the preferred embodiment of the present invention, each pulse moves or causes a carriage to move $1/1000$ of an inch along its supporting beam. As stated heretofore, for purposes of description, movement is limited to the X and Y directions and, therefore, only two channels have been shown in FIG. 5C of the drawings. Obviously, other selector switches could be added as the number of axial directions of motion are changed.

The word "channel" has been used to generically describe movement in either the X or Y direction and it is to be understood that each channel conveys information causing movement in either the plus or minus direction. Signals applied for movement along the A beams are processed in channel A and similarly, B beam movement data is processed in channel B. At any given time, data will arrive at the various terminals of the table electronics in accordance with the direction in which the movable assemblies are supposed to move. For the purposes of explanation, the input command pulses will be assumed positive and applied through selector switch 130 to the input electronics for motors 15, 16 on carriages P and Q for movement along the A beams.

Channel A is provided with a pair of input terminals 132, 133 connected to selector switch 130. Terminal 132 has been designated A command positive and terminal 133 has been designated A command negative. In a like manner, information for the B channel is applied through switch 131 to terminals 134 and 135. Terminal 134 has been designated B positive and terminal 135 has been designated B negative. Terminals 132–135 are connected to a pair of manual selector switches 136 and 137 where selector switch 136 is located in the A channel and selector 137 is located in the B channel. The selector switches 136, 137 are three positional switches which allow the operator at his console (see FIG. 6) to exert manual control over the operation of the automatic drafting machine. In their normal or center position, the automatic drafting machine operates under the control of the director as the director is controlled by input information read by the tape reader 50. In manual operation, the operator may switch the switches 136 and 137 to a jog position whereby he may cause the automatic drafting machine to jog one step along the line of travel along one of the axes of movement. This function can be achieved by the operating of a pair of switches 138, 139 for positive and negative jogs respectively along the A beams and by a pair of switches 140, 141 for positive and negative jogs along the B beam. These switches are shown in FIG. 6 as front panel switches on the operator's console. In a like manner, the operator may cause the drafting machine to step along the respective beams by operating switches 136, 137 to the stepping position and holding any one or two switches of the group 138–141 in the operated position. In a similar manner, the director can automatically command the stylus to step or jog either positively or negatively by applying the appropriate commands to terminals 142, 143 in the A channel and terminals 144, 145 in the B channel. These terminals may be connected to selector switches 130, 131. The transferral of data input from the director to the terminals 142–145 depends upon the mode set for the selector switches 136 and 137. If they are set in their normal or tape position, then information will be transferred from the terminals to a pair of zero offset switches 146 and 147 respectively. The zero offset switches 146 and 147 are also available on the operator's console for manual control purposes.

If the mode selector switches 136 and 137 are set in their alternate positions, that is, jog, meaning one-step movement of the scriber on the drafting machine, or step, meaning a series of discrete stepping movements along an axis on the drafting machine, then zero offset switch 146 is connected to the pushbutton switches 138, 139 on the operator's console and, in a like manner, zero offset switch 147 is connected directly to the pushbutton switches 140, 141 for the B channel on the operator's console. When the selector switches 136, 137 are in either of these latter two positions, then jog information is transmitted to the zero offset switch 146 in the A channel by the operation of either pushbuttons 138 or 139 and, in a like manner, jog information is transmitted in the B channel to the zero offset switch 147 by the manual operation of either switch 140 or 141. If the mode selector switches 136, 137 have been set in their jog positions, then operation of the pushbuttons 138–141 will transmit to the respective zero offset switches 146, 147 a single pulse in each channel, which pulse will be positive or negative depending upon the pushbutton operated.

The mode selector switches 136, 137 have been shown as discrete or separate switches; however, in actual practice, the two switches are ganged together and thus only one operating control is necessary to switch both channels from tape to the jog and stepping positions.

As has been implied heretofore, the switches 146, 147 control the transfer of information to the subsequent electronic circuits of the automatic drafting machine. If the switches 146, 147 are set in one position, they transfer whatever information has been passed through the mode selector switches 136, 137 to a pair of pulse separators 148 and 149 respectively. The pulse separators 148, 149 will be described below. In their alternative positions, switches 146, 147 transfer data to a pair of add-subtract counters 150, 151. The add-subtract counter 150 is connected to the drafting machine table's A axis position indicator 152 and the add-subtract counter 151 is connected to the drafting machine's B axis position indicator 153. The indicators 152, 153 may comprise any conventional visual read out registers and provide a visual indication at the operator's console of the position of the drawing tool on the table M.

For some applications, it is desired that the position indicator start from a zero at some other place on the table than the defined table zero-zero, or that it operate with respect to a point off the table. For this purpose, the counters and indicators can be disconnected from the servo controls and pulses introduced therein by depressing the zero offset pushbuttons 146, 147 shown on the control panel. Such pulses may originate from the jog control switches or the step control switches or, if desired, from tape readings. In the normal use of this feature, the stylus is returned to its zero-zero table position before the desired plus or minus offset is introduced.

As has been described previously, in normal operation, a point on the table is arbitrarily assumed to be the zero-zero position of a set of coordinate axes and in the preferred embodiment, this position was chosen as the lower left-hand corner of the drafting table M. Input command information causes the carriages P, Q and R to move from the zero-zero point on the table a discrete number of steps on the table surface in both the X and Y directions, i.e., along the A and B beams, and these positions are visually indicated on the registers 152, 153 to the operator at his console.

In the normal or tape, i.e., automatic, mode of operation of the drafting machine, the registers are under the control of the add-subtract counters 150, 151 which are connected to the digital transducers 22, 23 respectively. The registers in this mode of operation read achieved motion of the respective carriages P, Q and R by registering the pulse count output of the counters. The counters 150, 151 are in the preferred embodiment a series of bistable flip-flops that are connected to each other and to the registers 152, 153 by a series of conventional carry gates. The counters are sufficient in number to register all table positions of the carriages P, Q and R. Positive pulses from the transducers 22, 23 are transmitted along the positive transducer output leads to the counters and to the sign reversal switches 156, 157. They operate a bistable element in the counters 150, 151 to switch the counters to an Add mode by selecting appropriate carry gates, which are AND gates, connected between counter flip-flop stages. In a similar fashion, negative pulses from the transducers are applied to a second set of AND gates similarly located to switch the counters to a Subtract mode. The output of the respective carry gates may be connected to the input of the respective bistable elements in the counting chain by conventional OR gates. A one shot flip-flop is used in the preferred embodiment prior to the entry of an add or subtract pulse from the transducers 22, 23 into the first element of the counting chain to allow the add-subtract bistable element sufficient time to switch all carry gates prior to entry of the input pulse. The counters may be reset to zero by the operation of manual switches 158, 159 at the operator's position. The switches 158, 159 reset the add-subtract counters 150, 151 to their zero position.

It is possible to control the drafting machine from a computer and in embodiments utilizing a computer, the zero offset 146, add-subtract counter 150, visual readout 152, lines 154, sign reverse 156, and zero readout 158 and their counterparts in channel B become redundant. In such a case the selector switches are connected directly to the pulse separators 148 and 149.

PULSE SEPARATOR

In actual practice, the zero offsets 146, 147 are not connected for read out to the add-subtract counters 150, 151 but are connected for the transferral of information from the director to a pair of pulse separators 148 and 149. The pulse separators receive a pair of inputs which must be separated in time for the purpose of controlling the movement of the carriages P, Q and R. The separator 148 receives command data from the director through the zero offset switch 146 and the previously discussed switching circuitry. At the same time, pulse data is provided at a second input on the pulse separator 148 from the digital transducer 22 mounted on the movable carriages and this transducer continuously during operations reads out information indicative of the position of the carriage supporting the transducer. In a like manner, the pulse separator 149 receives information via the switching circuitry including the zero offset switch 147 on one input and receives information that must be sorted and separated from the data input provided by the director on a second input, which second input is taken from the transducer 23 mounted for movement on the R carriage and which thus continuously indicates the position of the R carriage along the B beam. The pulse separators function to separate pulses from the director and pulses from the transducers in time even if they come into the pulse separators simultaneously so that they are transmitted separately to the subsequent circuitry.

A partial schematic diagram of a pulse separator 148 or 149 is shown in FIG. 7 of the drawings. The schematic is partial in that the delay and storage units utilized in each of the pulse separators are the same and, therefore, only the delay and storage units for one input line have been shown. Assuming a positive command pulse from the director in the A channel, this pulse will be applied in parallel to a pair of one-shot delay flip-flops 162 and 163. The one-shot MV 162 has been arbitrarily chosen to delay the input command pulse for a period of five microseconds and subsequent to the delay to apply this pulse as an input to a storage flip-flop 164, thus setting the multivibrator 164. During the same interval, the parallel applied command pulse to the one-shot multivibrator 163 is utilized to provide a "1" input after a delay of 15 microseconds to an AND NOT gate 165. It will thus be seen that a command pulse applied from the director will cause the storage flip-flop 164 to "set" after a delay of 5 microseconds and that nothing more can be done to the flip-flop 164 for 10 additional microseconds.

The AND NOT gate 165 has its other input applied from an electronics commutator 166 which may consist of a ring of flip-flops or their equivalent where they are pulsed by a crystal clock 167 operating at 100 kc. in the preferred embodiment of the present invention. The comfutator effectively acts as an interrogator of the AND NOT gate 165 to determine whether or not an input pulse has been applied to the respective storage flip-flops. For each pulse separator, there would be four outputs applied to four AND NOT gates with sequential interrogation of each of the AND NOT gates. In this manner, pulses arriving at the input of the pulse separators 148 and 149 are separated by a regular interval depending upon the periodicity of the clock 167 and the number of stages in the commutator 166. The input information as illustrated in FIG. 7 at the input has virtual command of the storage flip-flop 164 for a delay period of 10 microseconds representing the difference in the delay period of the one-shots flip-flops 162, 163. After this period of time, an interrogation pulse arriving at AND NOT gate 165 is utilized to reset the storage flip-flop 164 if it has been set by an input pulse and provide an output from the storage flip-flop to an OR gate 168. The OR gate 168 is also connected to the output of the other three storage flip-flops, not shown.

The OR gate 168 is connected to the input of a differential counter 169. The differential counter also receives a pair of inputs from the commutator flip-flops 170 and 171 in the ring of flip-flops constituting the commutator 166. These later flip-flops are utilized to switch the differential counter 169 from its add to its subtract mode, thus after receiving a pulse from element 171, differential counter 169 will switch into an add mode and will be thus ready to receive add command pulses from the output of the OR gate 168. In a like manner, flip-flop 170 switches counter 169 into a subtract mode, thus setting the counter up to receive negative command pulses. Pulse separator 161 has identical circuitry and switches a differential counter 172 in the B-channel in the same manner. Following switching to the add or subtract modes and reception of positive or negative command information, it will be noticed that the next received information as separated in time by the pulse separator will be positive transducer information or negative transducer information where the positive transducer information follows negative command information switching of the counter 169 to its add mode.

DIFFERENTIAL COUNTER

The differential counters 169 and 172 are supplied with command and transducer information of opposite sign in each of their counting modes and therefore, can be made to differentially count pulses from the two pulse sources. A differential counter is required in that the output of the counter is used to control the motors 15, 16 and 17. If they have been moving in the negative direction along a beam and the director calls for a reversal, then a negative pulse from a transducer will be differentially counted with a positive pulse from the director, thus changing the signal applied to the motors.

The differential counters 169 and 172 utilize the difference between the pulses received from command and those received from the transducer to compute a binary number. In the preferred embodiment, transistor flip-flops are used as counters although other types of counters such as magnetic cores and the like may be substituted for those used in the preferred embodiment. A detailed schematic diagram showing a representation of the differential counter 169 is shown in FIG. 8 of the drawing. It will be understood that differential counter 172 is exactly like that shown and described with respect to FIG. 8.

The output of the pulse separator 148 is applied over line 173 to one of the inputs of a bistable multivibrator 174 in a series chain of eight multivibrators 174–181, counting in two's. The counting elements are interconnected by pairs of carry gates 182, 183, which in the preferred embodiment are AND gates connected to one input of each element of the chain after the first element by a conventional OR gate 184.

Add and subtract pulses from the commutator 166 are applied over a pair of lines 185 and 186 to the inputs of a bistable device 187. As is well known in the art, the bistable device 187 will switch between two outputs dependent upon whether or not a pulse has been applied to its inputs over the lines 185 and 186 .The outputs of the bistable device 187 are applied through a pair of emitter followers 188 and 189 to a pair of lines 190 and 191. The lines 190, 191 represent respectively the add and subtract command states of the commutator 166. The lines 190, 191 and thus, the multivibrator 187 and commutator 166 are applied to the other inputs of the series of carry gates 182, 183 interconnecting the elements of the counting chain. Add line 190 is connected in parallel to all gates 182 and subtract line 191 is connected in parallel to all gates 183.

The binary chain is entered through the carry gates and the next preceding element of the chain by taking the output of the two carry gates one representing the add mode and the other representing the subtract mode and carrying these outputs through the OR gate 184 to the input of the next element of the binary chain.

There are provisions in the counter for introducing pulses over a pair of channels 192 and 193 which sets the counter 169 to zero for test and other purposes to be described subsequently.

MODULATOR

The output of the counter 169 is applied over a series of circuits connected between the individual elements of the binary chain to a modulator 194. In a like manner, the output of the differential counter 172 is applied over a similar series of lines to the input of a modulator 195 in the B-channel. The modulators are required in that the motors 15, 16 and 17 utilized to drive the carriages P, Q and R over the drafting table M in the preferred embodiment of this invention are two phase motors operating from a 400 c.p.s. source. It is, therefore, necessary that the number stored digitally in the counter 169 be converted to an analog signal for the purpose of driving the motors 15, 16 and 17. This function is accomplished by and in the modulators 194, 195. A preferred embodiment of the modulator electronics is shown in FIG. 8 of the drawings with its inputs connected to the outputs of the differential counter 169.

The counter 169 and similarly the counter 172 have been designed so that the output from the counter is zero when the counter reads 127. Thus, the 400 c.p.s. input to the modulator 194 will be modulated in its negative half cycle by counts from 127 down to zero and similarly with the modulator in its positive half cycle by increasing counts from 128 to 255. The 400 c.p.s. signal has a RMS value of 3.15 volts and is introduced into the modulator along a line 196. The signal is superimposed upon a positive 10 volt DC bias, thus maintaining the alternating current signal positive at all times. Line 196 is connected in parallel to one terminal of a series of AND gates 197, utilized as summing gates where the gates 167 are connected on their other side to the individual elements of the binary chain through current limiting resistors 198. The counted output of the binary chain is present on the inputs of the summing gates 197 and is representative of the set condition of elements of the chain. Since the 400 cycle signal is always present on the other input of the gates, a set condition signal from any of the binary elements on the other input to any gate will add to and hence modulate the 400 c.p.s. signal. The outputs of the respective gates 197 are connected through a plurality of summing resistors 199 through 206 to the output line 207 of the modulator 194. The summing resistors 199 through 206 are weighted so that the smallest or unit number passes through the highest value of resistance which in the present embodiment was 128K ohms while the most significant or highest number passes through the lowest value of resistance which in the present embodiment was 1K ohm.

The summing resistors feed into a feedback operational amplifier according to principles well known in the analog computer art. For the purpose of simplifying the circuitry and in particular to eliminate steps regarding the direct current input to the feedback operational amplifier the reset position of the gates of the binary chain also operate a series of AND gates 208 where a 10 volt DC bias is applied to the other input of the gates 208 over a line 209. The output of the gates 208 is applied to a series of summing resistors 210 through 217. These gates pass only the 10 volt DC value from the line 209 and do not introduce an AC component.

In order to produce a zero signal in the modulator at a count of 127 on the binary chain, it was found necessary to introduce a second 400 cycle signal 180° out of phase with the AC signals applied over line 161. This signal is applied over a line 218 through a voltage controlling rheostat 219 to the modulator output line 207. In order to eliminate the direct current component at the summing point, it was necessary in the present embodiment of the invention to introduce a negative 10 volt DC bias which is applied to the modulator output line 207 by a line 220 through a voltage control 221.

SERVO SUMMING AND POWER AMPLIFIERS

Referring now to FIG. 5C, the modulated 400 c.p.s. signal from the modulator 194 is transmitted through line 207 to a pair of preamplifiers 223 and 224 which are serially connected in their output to a pair of power amplifiers 225 and 226 respectively. The power amplifiers 225, 226 are connected to the inputs of the motors 15, 16 mounted to move the P and Q carriages respectively. The preamplifiers also receive input signals from the respective tachometers 18, 19 for speed control, and the preamplifier 224 has an additional compensating input signal applied to it by the synchro control transformer 25. This latter signal insures the alignment of the carriages P and Q by slaving the operation of motor 16 to that of motor 15 in that motor 15 operates synchro transmitter 24. An input for quadrature compensation signals is also provided, which correct quadrature noise signals at zero from the tachometer, synchro-control transformer and other devices. In any specific preamplifier, the various 400 c.p.s. signal inputs are summed through summing resistors into a feedback operational type amplifier. They are then shifted in phase by 90° and after further amplification are applied to the amplifier stages of the 400 cycle servo motors 15, 16.

The control for the carriage R servo motor 17 is the same as that described for the servo motors 15, 16, except that it does not have a synchro system and therefore, it will not be described in detail.

It will be understood, however, that as an alternative construction, the synchros 24, 25 could be omitted and the carriage Q provided with a transducer and its movement controlled in a manner similar to that in which the movement of the carriage P is controlled.

ZERO RETURN

It is important to many applications of the apparatus that there be provided as a reference a point on the table representing an absolute A-beam zero and B-beam zero. This point is mechanically determined so that if through loss of power or for other reasons, the flow of data to the counters is interrupted, it will be possible to re-establish any position on the table or drawing. This 0, 0 point is reached by depressing a zero return button 227 shown on the operator's panel, FIGS. 5C and 6. When this button is depressed, by appropriate relay switches and time delay circuitry, the modulated 400 c.p.s. signal in the A and B channel modulators 194, 195 is disconnected and an unmodulated 400 cycle signal is applied to the servo amplifiers for both the A and B table axes to cause both the A beam servos 15 and 16 and the B beam servo 17 to move the carriages P, Q and R toward the A-axis zero and the B-axis zero. As the carriages approach a pair of mechanical stops 228, 229, see FIG. 1, trips 230, 231 carried by carriages P and R respectively actuate a pair of zero approach switches 232, 233 on beams A–1 and B. These switches reduce the amplitude of the unmodulated 400 cycle input to the servo motors to slow down the movable carriages so that they approach the mechanical stops slowly. The actuation of the zero approach switches 232, 233 also starts time delay devices 234, 235, see FIG. 5C, which allow ample time for the movable assemblies to arrive at their mechanical stops and be held there with sufficient pressure to insure fixed positions. The time delay elements 234, 235 may be any conventional delay circuit such as one shot flip-flops. When the time delay period expires, numbers 88 are typed into each of the differential counters 169 and 172 along line 193, FIG. 8, and the zero return button 227 is released. The release of zero return button 227 returns the modulator signals to servo control. The servos will then move the carriages P, Q and R .088 inch from the mechanical stop thereby reducing the signal in the differential counter to zero. This position is defined table A and B zero or merely as table zero.

OUT OF SYNCHRONISM

If differences larger than 128 bits are introduced into the differential counters, they will reverse their drive signal and subsequent data will have no value. This is an abnormal condition and protection is provided by out of sync controls 237 and 238, FIG. 5C, which cause signals to be emitted to the director along lines 239, 240 to stop the pulse trains, if for any reason the signals in either differential counter become larger than 96 bits. The out of sync detectors 237 and 238 monitor the differential counter outputs.

STYLUS AND TURRET CONTROLS

As stated above with respect to the general operation of the drafting machine, the active storage also controls auxiliary functions pertaining to stylus selection, operation and turret T commands on the table surface. The stylus is caused to make contact with the paper by energization of a solenoid 241. This is controlled by appropriate relays having holding circuits. A stylus down signal from the tape coming through the director to terminal 242 and calling for stylus down will operate relay and holding circuits, not shown, which will hold or maintain the solenoid 241 energized after the short pulse from the director is no longer active. When a pulse from terminal 243 is produced by appropriate tape coding, the holding circuit is broken by another relay so that the solenoid releases the stylus. The relays can also be operated by a manual stylus control 244, FIG. 6, to remain in either the up or down position.

Dashed lines can be produced by the drafting machine either automatically or manually. For this purpose a dash line generator 245 is provided to control the energization of solenoid 241. The dash line generator is a free running multivibrator which may be switched into the solenoid 241's energization circuit by the director through a pair of lines 246, 246'. A signal on line 25 switches the generator 244 on to energize solenoid 241. A signal on line 246 switches the generator off to deenergize the solenoid and thus lift the stylus off of the surface being marked.

The generator can be manually controlled from the operator's position by the operation of a switch 247, FIGS. 5C and 6. The operator then can produce dashed lines by manually energizing and deactivating solenoid 241 with stylus up-down switch 245. He can also control the period of the multivibrator in the dash line generator 244 by a pair of controls 248, 249. These controls operate a pair of rheostats connected in the RC feedback loops of the multivibrator. The control 248, therefore, controls the on time of a first transistor in the multivibrator and this transistor controls the energization period of solenoid 241. Likewise, control 249 determines the on period of a second transistor in the pair and therefore, controls the off time of the solenoid. Through the use of these controls, the operator manually determines the length of dashes and spaces in the dashed line.

The drafting apparatus may or may not be provided with a rotary turret provided with different pens or other scribing styli or other tools. The preferred embodiment shown and described has such a turret T advanced always in the same direction by a step equal to the space between the tools held in the turret. This step is produced by energization of the rotary solenoid 250, FIG. 5C upon the reception of a single input pulse from the director by way of line 251 as a result of instruction coded in the tape. Indexing of the turret T may also be effected by the depressing of turret index push button 252 on the control panel. The indexing of the turret may be placed under control of the director or the turret index switch 252 or it may be disconnected from all sources of signals by a turret control selector switch 253 on the control panel. Operation of switch 253 to its off position will cause the turret T to lock in its last indexed position. When switch 253 is in its index position, the operator can manually advance turret T by operating switch 252. In the switch 253's normal tape position, the director controls indexing. When a pulse is introduced into the control circuit for indexing the turret T, a monostable flip-flop unit, not shown, maintains an output signal of sufficient time duration to insure a full stroke of the solenoid 250.

VACUUM

A pair of push button switches 254, 255 on the control panel are provided for starting and stopping the vacuum pump connected to the vacuum chuck 10, FIG. 1 which holds the medium to be marked on the table. This system has an interlock switch such that if a vacuum is called for and not achieved, the controls will prevent the stylus from going down and the motors 15, 16 and 17 from operating.

FEED RATE CONTROL

As mentioned with reference to the switching matrix 58, FIG. 5A, the director includes a feed rate control 65*a*, which is manually operable. The feed rate control determines the speed at which the stylus moves over the material to be marked and proportions the speed between the carriages P, Q and R in accordance with information received from the tape.

From the foregoing description of the preferred embodiment of the invention and alternative constructions mentioned, it will be apparent that the objects of the invention heretofore enumerated and others have been accomplished. While the preferred embodiment of the invention has been described in considerable detail, it is to be understood that alternative constructions and arrangements may be employed, for example, the information source could be absolute as well as incremental digital data and the servo control may utilize absolute as well as incremental information, etc.

It is the intention to hereby cover all embodiments of the invention which come within the practice of those skilled in the art to which it relates and the appended claims.

We claim:

1. In an electronically controlled automatic drafting machine including a marking instrumentality capable of moving in a coordinate system, and an article to be marked by said marking instrumentality, said article being supported on a table; first digital storage means containing information to be utilized for controlling the movement of said marking instrumentality; second digital storage means containing permanent information to be utilized for controlling the boundaries of movement of said marking instrumentality; third digital storage means containing permanent information to be utilized by said marking instrumentality for the purpose of scribing standardized symbols on said articles to be marked; data transfer means connected to said first, second and third storage means for converting digital information contained in said first, second and third storage means into pulse information; switching means under the control of said first storage means for selecting a particular one of said first, second or third storage means for read-out into said data transfer means; conversion means connected to said data transfer means for converting said pulse information into analog signals; motive power means connected to said conversion means for moving said marking means on said articles to be marked; and means connected to said data transfer means for moving said marking means into contact with said article or articles to be marked.

2. In an electronically controlled automatic drafting machine including a marking instrumentality capable of moving in a coordinate system, and an article to be marked by said marking instrumentality, said article being supported on a table; first digital storage means for controlling the movement of said marking instrumentality; means for reading out said first storage means; means for providing a parity check on information contained in said first storage means; second digital storage means containing permanent information to be utilized for controlling the dimensional movements of said marking instrumentality; third digital storage means containing permanent information to be utilized by said marking instrumentality for the purpose of scribing standardized symbols on said article to be marked; pulse forming means connected in the output circuitry of said first, second and third storage means for converting digital information contained in said first, second and third storage means into related pulse information; distributor means connected between the output of said first storage means and said pulse forming means for transferring primary information to said pulse forming means and control information to said second and third storage means; switching means connected to said distributor means for transferring control information to said second and third storage means whereby said second and third storages are selectively connected to said pulse forming means; conversion means connected to said pulse forming means for converting pulse information into analog signals; motive power means connected to said conversion means for moving said marking means on said articles to be marked; and means connected to said pulse forming means for moving said marking means into contact with said article or articles to be marked.

3. In an electronically controlled automatic drafting machine including a marking instrumentality and an article to be marked by said marking instrumentality, said article being supported on a table; first digital storage means containing information to be utilized for controlling the movement of said marking instrumentality; second digital storage means including a storage matrix, containing permanent information to be utilized for controlling the dimensional movements of said marking instrumentality; third digital storage means containing permanent information to be utilized by said marking instrumentality for the purpose of scribing standardized symbols on said article to be marked; a Director for transforming digital information into pulse information; a first data distributor connected to the output of said first storage means and to the input of said Director for transferring digital information from said first storage means to said Director; switching means connected to said first data distributor and to said second and third storage means for switching control information impressed on said first data distributor by said first storage means between said second and third storage means; a second data distributor connected between said second storage means and said Director for transferring information from said second storage means to said Director; a third data distributor connection between said third storage means and said Director for transferring data from said third storage means to said Director; and means connected to said Director and said marking instrumentality for utilizing the information in said Director to move said mark instrumentality on said article to be marked.

4. In an electronically controlled automatic drafting machine including a marking instrumentality and an article to be marked by said marking instrumentality, said article being supported on a table; first digital storage means containing information to be utilized for controlling the movement of said marking instrumentality; second digital storage means containing permanent information to be utilized for controlling the dimensional movements of said marking instrumentality; third digital storage means, including a drum store and drum logic, containing permanent information to be utilized by said marking instrumentality for the purpose of scribing standardized symbols on said article to be marked; a Director for converting digital information into pulse information; a first data distributor connected between the output of said first storage and said Director for transferring primary information contained in said first storage to said Director, selecting means connected to said first data distributor and to said second and third storage means for selectively transferring information impressed on said first data distributor by said first storage means to said second and third storages; a second data distributor connected between said Director and said second storage means for transferring digital information from said second storage means to said Director; means connected to said selection means for controllably transferring information from said selecting means to said third storage so as to selectively read-out digital information contained in said third storage means; means including a third data distributor, connected to said third storage and to said Director for controllably reading out information from said third storage and for controllably transferring said information to said Director; and means connected to said Director and said marking instrumentality for utilizing the information in said Director to move said marking instrumentality on said article to be marked.

5. In an electronically controlled automatic drafting machine including a marking instrumentality and an article to be marked by said marking instrumentality, said article being supported on a table; primary digital storage means containing control information and command information, said command information to be utilized for controlling the movement of said marking instrumentality; secondary digital storage means connected to and controlled by said primary storage means, said secondary storage means containing permanent information to be utilized for controlling the movements of said marking instrumentality, said permanent information consisting of standardized symbols; transfer means connected to said primary and secondary storage means for recognizing said control information contained in said primary storage, for switching the control of said marking instrumentality from said primary storage means to said secondary storage means, and for transferring said control information to said secondary storage means; means connected to said secondary storage means for reading out permanent information from said secondary storage; means connected to said read-out means and to said transfer means for converting information from each of said storage means into analog signals; motive power means connected to said conversion means for moving said marking means on said article to be marked; and means connected to said conversion means for moving said marking means into contact with said article to be marked.

6. In an electronically controlled automatic drafting machine including a marking instrumentality and an article to be marked by said marking instrumentality, said article being supported on a table; primary digital storage means containing control information and command information, said command information to be utilized for controlling the movement of said marking instrumentality; secondary storage means, including a magnetic drum connected to and controlled by said primary storage, said secondary storage means containing permanent information to be utilized for controlling the movement of said marking instrumentality, said permanent information consisting of standardized symbols to be scribed on said article to be marked; data distributor means connected to said primary storage means for transferring command information to said marking instrumentality, and for transferring control information to said secondary storage means; means including character recognition means, connected between said secondary storage and said data distributor for processing control signals from said primary storage and for correlating said control signals with standardized signals contained in said secondary store; means, including a counting device and a block recognition matrix, for reading out recognized bits from said secondary store; gating means connected to said recognition means, said secondary storage means and said counting device for transferring bits of information from said secondary storage means to said block recognition matrix; second data distributor means connected to said block recognition matrix for controllably energizing said marking instrumentality; and feedback means connected between said block matrix, said recognition means, and said primary store for indicating end of block transfer complete.

7. In an electronically controlled automatic drafting machine including a marking instrumentality and an article to be marked by said marking instrumentality, said article being supported on a table; a plurality of digital storage means containing information for controllably energizing said marking instrumentality; first data conversion means connected to said plurality of storage means for converting said digital information into pulse information; second data conversion means for translating said pulse information into analog signal information; pulse circuit transfer means connecting said first conversion means with said second conversion means; and motive power means connected to said second conversion means and said marking instrumentality for moving said marking means on said article to be marked.

8. In an electronically controlled automatic drafting machine including a marking instrumentality and an article to be marked by said marking instrumentality, said article being supported on a table; a plurality of digital storage means, including at least a first primary storage means and two secondary storage means containing information of a permanent character, for controllably energizing said marking instrumentality, a Director connected to said plurality of storage means and selectably energized by said storage means; motive power means under the control of said Director for moving said marking instrumentality on an article to be marked; transducer means mounted on said motive power means to provide a digital signal indicative of the position of said marking means on said article to be marked; and means including logic circuitry for converting said digital information from said Director and from said transducer into analog signals to drive said motive power means.

9. In a Director controlled automatic drafting machine including a plurality of digital command storages and means for automatically connecting said storages individually to said Director to supply drafting command signals thereto, and including a powered marking instrumentality; a plurality of motive powered movable assemblies for traversing said marking instrumentality on an article to be marked; digital transducer means mounted on said movable assemblies to provide continuous digital outputs indicative of the position of said movable assemblies; data transfer means, including a differential counting device, connected to said Director and said transducer means to provide binary information representative of the difference between digital information contained in the output of said Director and said transducer means; conversion means connected to said transfer means for changing said binary information into analog signals; and circuit means for applying said analog information to said movable assemblies for driving said marking instrumentality over said article to be marked.

10. In a Director controlled automatic drafting machine including a plurality of digital command storages and means for automatically connecting said storages individually to said Director to supply drafting command signals thereto, and including a powered marking instrumentality; a plurality of motive powered movable assemblies for traversing said marking instrumentality on an article to be marked; at least two digital transducers mounted on said movable assemblies so as to provide continuous digital information as to the position of said assemblies relative to said articles to be marked; first transfer means, including a differential counting device, for receiving digital information from a first of said transducers and from said Director for computing a first binary number representative of the difference between said digital inputs; second transfer means, including a second differential counting device, for receiving digital information from the second of said transducers and from said Director for computing a second binary number representative of the difference between said digital inputs; first conversion means connected to said first transfer means for converting said first binary difference number into a first analog signal; second conversion means connected to said second transfer means for converting said second binary difference number into a second analog signal; first circuit means connected to said first conversion means for applying said first analog signal to said movable assemblies; and second circuit means connected to said second conversion means for applying said second analog signal to said movable assemblies.

11. In an electronically controlled automatic drafting machine including a marking instrumentality and an article to be marked by said marking instrumentality, said article being supported on a table; primary digital storage means containing controlled information and command information, said command information to be utilized for controlling the movement of said marking instrumentality; secondary storage means including a magnetic drum connected to and controlled by said primary storage; said secondary storage means containing permanent information to be utilized for controlling the movements of said marking instrumentality, said permanent information consisting of standardized symbols to be inscribed on said article to be marked; data distributor means connected to said primary storage means for transferring command information to said marking instrumentality, and for transferring controlled information to said secondary storage means; means, including character recognition means, connected between said secondary storage and said data distributor for processing control signals from said primary storage and for correlating said control signals with standardized signals contained in said secondary store; means, including a counting device and a block recognition matrix, for reading out recognized bits from said secondary store; gating means connected to said recognition means, said secondary storage means, and said counting means for transferring bits of information from said secondary storage means to said block recognition matrix; a second data distributor means connected to said block recognition matrix for controllably energizing said marking instrumentality; feedback means connected between said block matrix, said recognition means, and said primary store for indicating end of block transfer complete; and means connected to said recognition means, said gating means, and said secondary store for erasing standardized information on said secondary store and for entering new information to be utilized in conjunction with said marking instrumentality.

12. In a Director controlled automatic drafting machine including a plurality of digital command storages and means for automatically connecting said storages individually to said Director to supply drafting command signals thereto, and including a marking instrumentality; a plurality of motive powered movable assemblies for traversing said marking instrumentality on an article to be marked; digital transducers mounted on said movable assemblies for indicating the position of said marking instrumentality; a circuit means connected to said Director and said transducers separating in time information received from said Director from information received from said transducers; commutator means connected to said circuit means to produce an output that is alternately representative of digital information in said Director and transducers; counting means connected to said circuit means and said commutator means for differentially counting information received from said Director and said transducers so as to produce binary information representing the difference between information received from said Director and said transducers; conversion means connected to said counting means for converting said binary information into analog signals; means for applying said analog signals to said motive powered movable assemblies to cause said marking instrumentality to traverse said article to be marked.

13. In a Director controlled automatic drafting machine including a plurality of digital command storages and means for automatically connecting said storages individually to said Director to supply drafting command signals thereto, and including a marking instrumentality; a plurality of motive powered movable assemblies for traversing said marking instrumentality on an article to be marked; at least two digital transducers mounted on said movable assemblies for indicating the position of said marking instrumentality; first circuit means connected to one of said digital transducers and to said Director for separating in time information received from said Director from information received from said transducer; second circuit means connected to the second of said digital transducers and said Director for separating in time information received from said Director from information received from said transducer; commutator means connected to said first and second circuit means for interrogating said first and second circuit means so as to alternately produce an output representative of the digital information applied to said first and second circuit means from said Director and said transducer; first counting means connected to said first circuit means and said commutator means for differentially counting information received from the Director and one of said transducers so as to produce binary information representing the difference between information received from said Director and the first of said transducers; second counting means connected to said second circuit means and said commutator means for differentially counting information received from said Director and the second of said transducers so as to produce binary information representing the difference between information received from said Director and the second of said transducers; first conversion means connected to said first counting means for converting the output information of said first counting means into analog signals; second conversion means connected to said second counting means for converting the output information of said counting means into analog signals; and means applying said analog signals to said motive powered movable assemblies to cause said marking instrumentality to traverse said article to be marked.

14. In a Director controlled automatic drafting machine having at least two independent sources of digital command information individually and automatically connectable to the Director, one of said sources being effective to supply digital drawing signals to said Director and control signals for connecting the other of said sources to said Director, the other source upon receiving control signals from said first source being effective to supply semi-permanently stored command signals to said Director, and having a member movable by servo motor means in response to motion command pulses; transducer means adapted to be operatively connected to said movable member and provide digital pulses indicative of movement of said member; a bidirectional counter having a plurality of serially connected stages of increasing order; means for non-ambiguously applying command pulses from said Director and transducer pulses to the lowest order stage of said bi-directional counter; a digital-to-analog converter coupled to said bidirectional counter to convert the output to an analog signal; and means for applying said signal to the servo motor means to effectuate motion of said member.

References Cited

UNITED STATES PATENTS

| | | |
|---|---|---|
| 2,867,724 | 1/1959 | Olson. |
| 3,069,608 | 12/1962 | Forrester et al. |
| 3,099,777 | 7/1963 | Davis. |
| 3,206, 665 | 9/1965 | Burlingham. |
| 3,303,332 | 2/1967 | Götz. |
| 3,386,020 | 5/1968 | Brock et al. |

THOMAS E. LYNCH, Primary Examiner

U.S. Cl. X.R.

318—162; 33—18; 340—172.5; 235—151.11